US011282012B1

(12) United States Patent
Mandaro et al.

(10) Patent No.: US 11,282,012 B1
(45) Date of Patent: Mar. 22, 2022

(54) GRAPHICAL USER INTERFACE INCLUDING CONFIGURABLE ELECTRONIC CARDS

(71) Applicant: EducationDynamics, LLC, Hoboken, NJ (US)

(72) Inventors: Raymond Mandaro, Westwood, NJ (US); Steven Tyler Hamilton, Teaneck, NJ (US)

(73) Assignee: EducationDynamics, LLC, Hoboken, NJ (US)

(*) Notice: Subject to any disclaimer, the term of this patent is extended or adjusted under 35 U.S.C. 154(b) by 931 days.

(21) Appl. No.: 14/818,000

(22) Filed: Aug. 4, 2015

Related U.S. Application Data

(60) Provisional application No. 62/033,014, filed on Aug. 4, 2014.

(51) Int. Cl.
G06Q 10/06 (2012.01)
G06F 3/0484 (2022.01)

(52) U.S. Cl.
CPC ....... G06Q 10/0633 (2013.01); G06F 3/0484 (2013.01)

(58) Field of Classification Search
CPC .................... G06Q 10/0633; G06F 3/0484
See application file for complete search history.

(56) References Cited

U.S. PATENT DOCUMENTS 5,727,161 A * 3/1998 Purcell, Jr. ............ G06F 40/18
705/7.36
6,052,122 A 4/2000 Sutcliffe et al.
(Continued)

FOREIGN PATENT DOCUMENTS

WO 1999017242 4/1999

OTHER PUBLICATIONS

Biczysko, Daniel, 2010. CRM solutions for Education. In: P. Jalowiecki and A. Orlowski, ed. 2010. Information systems in management, Distant Learning and Web Solutions for Education and Business. WULS Press, Warsaw, 1st edition, pp. 18-29. (Year: 2010).*

(Continued)

Primary Examiner — Robert D Rines
Assistant Examiner — Alissa D Karmis
(74) Attorney, Agent, or Firm — Amster, Rothstein & Ebenstein LLP

(57) ABSTRACT

A computer-implemented method to generate a graphical user interface for a lead management system includes calculating, by a lead management system, lead management data based on determined type and format of the data and raw lead management data, generating first machine-readable instructions to render a graphical user interface including a first lead management data graphical representation, the first lead management data graphical representation including one or more graphical representations of electronic cards each configurable between: (i) a first orientation in which the electronic card displays a portion of the calculated lead management data; and (ii) a second orientation in which the electronic card displays first and second data relating to the type and format of the portion of the calculated lead management data, and transmitting, to a user electronic device, the first machine-readable instructions so as to cause the user electronic device to render the graphical user interface on a display associated with the first user electronic device.

14 Claims, 26 Drawing Sheets

(56) References Cited

U.S. PATENT DOCUMENTS

| | | | |
|---|---|---|---|
| 6,058,367 A | 5/2000 | Sutcliffe et al. | |
| 6,266,659 B1 | 7/2001 | Nadkarni | |
| 6,385,620 B1 | 5/2002 | Kurzius et al. | |
| 7,194,481 B1 | 3/2007 | Van Roon | |
| 7,457,764 B1 | 11/2008 | Bullock et al. | |
| 7,502,748 B1 | 3/2009 | Baldwin et al. | |
| 8,756,521 B1* | 6/2014 | Farchmin | G06Q 10/06 715/771 |
| 9,152,680 B1 | 10/2015 | Milian et al. | |
| 2001/0039508 A1 | 11/2001 | Nagler et al. | |
| 2001/0042000 A1 | 11/2001 | Defoor, Jr. | |
| 2004/0068429 A1* | 4/2004 | MacDonald | G06Q 10/0639 705/7.29 |
| 2004/0197761 A1 | 10/2004 | Boehmer | |
| 2005/0049986 A1* | 3/2005 | Bollacker | G06Q 10/04 706/46 |
| 2006/0047553 A1* | 3/2006 | Fuhrmann | G06Q 10/1095 705/7.19 |
| 2006/0161534 A1 | 7/2006 | Carson et al. | |
| 2007/0204212 A1* | 8/2007 | Chamberlain | G06F 40/18 715/212 |
| 2007/0219850 A1* | 9/2007 | Fischer | G06Q 10/063 705/7.31 |
| 2010/0094774 A1* | 4/2010 | Jackowitz | G06Q 40/00 705/36 R |
| 2010/0107060 A1 | 4/2010 | Ishizuka | |
| 2011/0107241 A1* | 5/2011 | Moore | G06F 17/3089 715/760 |
| 2011/0302159 A1 | 12/2011 | Mikesell et al. | |
| 2011/0306028 A1 | 12/2011 | Galimore | |
| 2012/0158422 A1 | 6/2012 | Burnham et al. | |
| 2012/0191704 A1* | 7/2012 | Jones | G06F 3/0484 707/722 |
| 2012/0221407 A1* | 8/2012 | Erasmus | G06Q 30/02 705/14.43 |
| 2013/0166471 A1* | 6/2013 | Fukuda Kelley | G06F 17/30038 705/344 |
| 2013/0262199 A1* | 10/2013 | Murphy | G06Q 30/0241 705/14.4 |
| 2013/0283194 A1* | 10/2013 | Kopp | G06F 3/0481 715/764 |
| 2014/0108289 A1* | 4/2014 | Eitan | G06Q 50/01 705/342 |
| 2014/0122595 A1 | 5/2014 | Murdoch et al. | |
| 2014/0222482 A1 | 8/2014 | Gautam et al. | |
| 2014/0249912 A1* | 9/2014 | Znerold | G06Q 30/0242 705/14.41 |
| 2015/0212700 A1* | 7/2015 | Mithal | G06F 3/0482 715/765 |
| 2016/0098153 A1* | 4/2016 | Gupta | G06F 3/0483 715/765 |

OTHER PUBLICATIONS

McGuire Joan M., et al., A Decision-Making Process for the College-Bound Student: Matching Learner, Institution, and Support Program, Learning Disability Quarterly, vol. 10, No. 2, Spring 1987.
Swigger, Keith, Enrollment Management in the Library School, Journal of Education for Library and Information Science, vol. 30, No. 4, Spring 1990.
Utility U.S. Appl. No. 15/008,198, filed Jan. 27, 2016.
Utility U.S. Appl. No. 14/842,334, filed Sep. 1, 2015.

* cited by examiner

FIG. 11B glass panel — Marketing ▼ | Admissions ▼ | Configuration ▼ | Reporting | Call 📞 ▼     △ Marge Becker ▼ [Search for a prospect]

2000

- Military
- Highest education level
- Years of Work Experience

Vendor Information
- Vendor: EducationDynamics
- Vendor Signer: Sally Accountmanager
- Vendor Signer Phone: (301) 377-3000
- Vendor Signer Email: sallyam5515@gmail.com

Duplicate Student Prospect Conditions
Duplicate received during this campaign: 30 days prior to the effective date will be screened.
Look-back scope: Check for duplicates within this media plan across vendors Christian Education (CE)

$ Cost Per Student Prospect: $50
Live Kit Version: 2

Insertion Orders — 2002
Active Accepted by All Parties
☐ IO-19248M2 Completed Draft None $150,000.00

Product Capping
Media Plan
15565000

Validation Profile — 2004

| Field | Required | Duplicates |
|---|---|---|
| Campaign | | |
| Email | ✓ | ✓ |
| First Name | ✓ | |
| Last Name | ✓ | ✓ |
| Phone | ✓ | ✓ |

FIG. 12C

GRAPHICAL USER INTERFACE INCLUDING CONFIGURABLE ELECTRONIC CARDS

CROSS-REFERENCE TO RELATED APPLICATION

This application is a non-provisional based on U.S. Provisional Patent Application No. 62/033,014, filed Aug. 4, 2014, which in turn is related to U.S. patent application Ser. No. 13/837,797, the contents of which are hereby incorporated by reference in their entirety.

FIELD

The present disclosure generally relates to graphical user interfaces, and in particular to graphical user interfaces having particular application as a business intelligence tool, such as a business intelligence tool for lead management systems.

BACKGROUND

Conventional user interfaces in the business intelligence realm are not flexible in their ability to filter and display information so that such information is limited in terms of the speed in which it is delivered, the accuracy in conveyance, and the usability of the information actually conveyed. This is particularly true in the context of lead management, where large amount of data regarding leads is collected and must be sorted through in order to determine the effectiveness of those leads. If effectiveness of leads cannot be determined by quickly accessing and viewing appropriate data regarding those leads, opportunities may be lost and accurate measurement of vendor effectiveness can not be achieved.

SUMMARY

Various exemplary embodiment of the present invention are directed to a computer-generated graphical user interface that includes configurable electronic cards. Each card dynamically displays filtered aspects of lead management data of a lead management system with real-time and persistent data updates, so that such data can be accessed and viewed quickly and efficiently in a highly usable manner that allows for effective business decisions. Since the electronic cards display only the focused and drilled down data that is most informative of the lead effectiveness and performance as compared to the comparatively large amount of comprehensive stored lead data, the overall lead management system is able to operate more efficiently with less load on its computer processor systems. Further, the graphical user interface according to exemplary embodiments of the present invention allows users to control the amount and type of data for display in a quick and efficient manner as compared to conventional business intelligence tools that allow such control only in a very limited and time-consuming manner.

A computer-implemented method to generate a graphical user interface for a lead management system according to an exemplary embodiment of the present invention comprises: (a) providing a graphical user interface viewer application to one or more users for installation on remote user electronic devices; (b) receiving, by a lead management computer system comprising one or more computers and non-transitory computer-readable memory operatively connected to the one or more computers, from a user electronic device, a request to access lead management data defined by: (i) first data related to type of lead management information to be accessed; and (ii) second data related to format of the lead management information to be accessed; (c) calculating, by the lead management computer system, the lead management data by: (i) determining, by the lead management system, the type of lead management data to be calculated based on the first data; (ii) determining, by the lead management system, the format of the lead management data to be calculated based on the second data; (ii) accessing, by the lead management system, one or more databases to obtain raw lead management data; and (iii) calculating, by the lead management system, the lead management data based on the determined type and format and the accessed raw lead management data; (d) generating, by the lead management computer system, first machine-readable instructions to render a graphical user interface including a first lead management data graphical representation, the first lead management data graphical representation comprising one or more graphical representations of electronic cards each configurable between: (i) a first orientation in which the electronic card displays a portion of the calculated lead management data; and (ii) a second orientation in which the electronic card displays the first and second data corresponding to the portion of the calculated lead management data; and (e) transmitting, by the lead management data computer system to the user electronic device, the first machine-readable instructions so as to cause the user electronic device to render the graphical user interface on a display associated with the user electronic device, wherein the transmission of the first machine-readable instructions allows the one or more users to reconfigure the electronic cards between the first and second orientations by using the graphical user interface viewer application.

In an exemplary embodiment, the computer-implemented method further comprises the step of determining, by the lead management computer system, whether to authorize access to the lead management data.

In an exemplary embodiment, the step of determining whether to authorize access comprises: receiving, by the lead management computer system, from the user electronic device, user identification data; and determining, by the lead management computer system, whether the user identification is valid.

In an exemplary embodiment, the computer-implemented method further comprises: generating, by the lead management system, second machine-readable instructions to render the graphical user interface with a second lead management data graphical representation comprising one or more graphical elements configured for input of the first and second data; and transmitting, by the lead management data computer system to the user electronic device, the second machine-readable instructions so as to cause the user electronic device to render the graphical user interface with the second lead management data graphical representation on the display associated with the user electronic device, wherein the transmission of the second machine-readable instructions allows the one or more users to input the first and second data to the one or more graphical elements by using the graphical user interface viewer application.

In an exemplary embodiment, the type of lead management information comprises one or more types selected from the group consisting of: count, total cost, rate, cost per lead attribute, cost per lead and average time.

In an exemplary embodiment, the format of lead management information comprises one or more formats selected from the group consisting of: number, percentage and dollar amount.

In an exemplary embodiment, the computer-implemented method further comprises the steps of: receiving, by the lead management computer system, from the user electronic device, updated first and second data; and calculating, by the lead management computer system, updated lead management data by: (i) determining, by the lead management system, the type of lead management data to be calculated based on the updated first data; (ii) determining, by the lead management system, the format of the lead management data to be calculated based on the updated second data; (ii) accessing, by the lead management system, one or more databases to obtain raw lead management data; and (iii) calculating, by the lead management system, updated lead management data based on the determined type and format and the accessed raw lead management data; wherein the first lead management data graphical representation comprises one or more graphical representations of electronic cards that display the updated lead management data.

In an exemplary embodiment, the computer-implemented method further comprises the steps of: receiving, by the lead management computer system, from the user electronic device, a request to access lead management data at a lower hierarchy than the calculated lead management data; generating, by the lead management computer system, second machine-readable instructions to render a graphical user interface including a second lead management data graphical representation, the second lead management data graphical representation comprising one or more graphical elements configured for display of the lead management data at the lower hierarchy than the calculated lead management data; and transmitting, by the lead management data computer system to the user electronic device, the second machine-readable instructions so as to cause the user electronic device to render the graphical user interface on a display associated with the user electronic device, wherein the transmission of the second machine-readable instructions allows the one or more users to view and manipulate the lower hierarchy lead management data by using the graphical user interface viewer application.

In an exemplary embodiment, the step of receiving a request to access lower hierarchy lead management data comprises: receiving, by the lead management computer system, from the user electronic device, a selection of the calculated lead management data as displayed in one of the one or more graphical representations of electronic cards for which the lower hierarchy lead management data is to be determined.

A mobile electronic device according to an exemplary embodiment of the present invention comprises: an electronic display; a graphical user interface viewer application that allows for reconfiguration of a first lead management data graphical representation as displayed in a graphical user interface on the electronic display, the first lead management data graphical representation comprising one or more graphical representations of electronic cards each configurable between: (i) a first orientation in which the electronic card displays a portion of lead management data as calculated by a remote lead management system; and (ii) a second orientation in which the electronic card displays first data related to type of lead management information to be accessed and second data corresponding to format of the lead management information to be accessed, the first and second data having been used by the remote lead management system to calculate the portion of the lead management data.

In an exemplary embodiment, the graphical user interface viewer application allows for input of the first and second data to one or more graphical elements of a second lead management data graphical representation as displayed in the graphical user interface on the electronic display.

Systems, methods, and program products for use with a lead management system, including an education lead management system, and other products or services used in lead generation, are disclosed.

In embodiments, systems, methods, and program products for matching applicants with educational institutions comprise lead management systems further comprising one or more databases having institution data, user data, vendor data, and other data. The lead management systems may operatively connect to one or more institutions, one or more web properties, and one or more user devices.

In embodiments, a computer-implemented method may comprise the steps of (i) receiving input from an institution; (ii) configuring and storing institution input as data in a lead management system; (iii) creating and or modifying rules in the lead management system based on institution data; (iv) receiving input from a user; (v) configuring and storing user input as data in the lead management system; (vi) associating user data with an institution account according to institution rules; (vii) receiving a request from the institution to analyze user data; (viii) analyzing data and displaying on a user interface; and (ix) receiving a request from the institution to modify institution data.

In embodiments, the computer-implemented method may further comprise the steps of monitoring user activity; updating user activity in the lead management system; monitoring conversion rates by analyzing user data; notifying institution user when conversion rates fall below predetermined goals; and/or sending a communication to a vendors through the system.

In embodiments, a system may comprise one or more networked computers comprising one or more processors and computer-readable memory, the one or more networked computers comprising an analysis module configured to analyze data associated with user input and a user interface module configured to display the data and allow the user to change the parameters of the analysis and/or a recorded lead management plan associated with the user.

A lead management system according to an exemplary embodiment of the present invention comprises: one or more data processing apparatus; and a non-transitory computer-readable medium coupled to the one or more data processing apparatus having instructions stored thereon which, when executed by the one or more data processing apparatus, cause the one or more data processing apparatus to perform a method comprising: receiving, using the one or more data processing apparatus, user data from one or more user computers associated with one or more users; receiving, using the one or more data processing apparatus, at least one of the following types of data: 1) vendor data from one or more vendor computers associated with one or more vendors that provide leads to the one or more users; and 2) lead data associated with one or more leads provided to the one or more users; analyzing, using the one or more data processing apparatus, the at least one of the lead data and the vendor data so as to generate at least one of vendor performance data and lead conversion data; generating, using the one or more data processing apparatus, a user interface that displays the user data and the at least one of the vendor performance data and the lead conversion data; and receiving, using the one or more data processing apparatus, from the one or more user computers, a request to modify the user data.

In at least one embodiment, the user data comprises lead goal data.

In at least one embodiment, the lead goal data comprises data associated with information consisting of at least one of the following types of goal information: cost per lead, limit per vendor, cost per enrollment, enrollment rate, cost per contact, cost per interview, cost per application and cost per start.

In at least one embodiment, the method further comprises the step of generating, using the one or more data processing apparatus, an alert associated with the lead goal information.

In at least one embodiment, the lead conversion data comprises data associated with information consisting of at least one of the following types of information: number of leads contacted by user representatives, number of leads interviewed by user representatives, number of leads who have applied for enrollment, number of leads who have enrolled and the number of leads who have started.

In at least one embodiment, the vendor performance data comprises, for each vendor, data associated with information consisting of at least one of the following types of information: total leads, valid leads, screened leads, rejected leads and lead pace.

In at least one embodiment, the user data comprises data associated with rules that determine the user data and the at least one of the vendor performance data and the lead conversion data displayed in the user interface.

In at least one embodiment, the step of receiving a request to modify the user data comprises a request to change the rules.

In at least one embodiment, the method further comprises the step of providing, using the one or more data processing apparatus, a portal that provides for communication between the one or more vendor computers.

In at least one embodiment, the method further comprises the step of configuring, using the one or more data processing apparatus, a user account for each of the one or more users based on the respective user data.

A lead management system comprising: a non-transitory computer readable medium having stored thereon: a data storage engine for storing the following types of data: 1) user data from one or more user computers associated with one or more users; 2) at least one of vendor data from one or more vendor computers associated with one or more vendors that provide leads to the one or more users and lead data associated with one or more leads provided to the one or more users; a marketing engine for analyzing the at least one of the lead data and the vendor data so as to generate at least one of vendor performance data and lead conversion data; an interface module for generating a user interface that displays the user data and the at least one of the vendor performance data and the lead conversion data; and a decision engine for modifying the user data based on input received from the one or more user computers.

In at least one embodiment, the lead management system further comprising a portal for providing communication between the one or more vendor computers.

BRIEF DESCRIPTION OF THE DRAWINGS

Exemplary embodiments of the present invention will be described with references to the accompanying figures, wherein:

FIGS. FIGS. 9A-9C show exemplary screenshots of a dashboard card builder of a graphical user interface according to an exemplary embodiment of the present invention.

FIGS. 11A-11C show an exemplary screenshot of a media plan builder interface according to an exemplary embodiment of the present invention.

FIGS. 12A-12C show exemplary screenshots of a graphical user interface according to an exemplary embodiment of the present invention.

DETAILED DESCRIPTION

In embodiments, the present invention generally relates to graphical user interfaces, and in particular to graphical user interfaces made available as components of systems, methods, and program products for lead management, including education lead management, and other products or services used in lead generation.

For purposes of discussion, without limiting the scope of the invention, embodiments involving education lead management systems may be discussed to illustrate the present invention. The disclosure can encompass other forms of lead management systems, including for vocational institutions, business institutions, and insurance institutions, to name a few.

Figure 1:
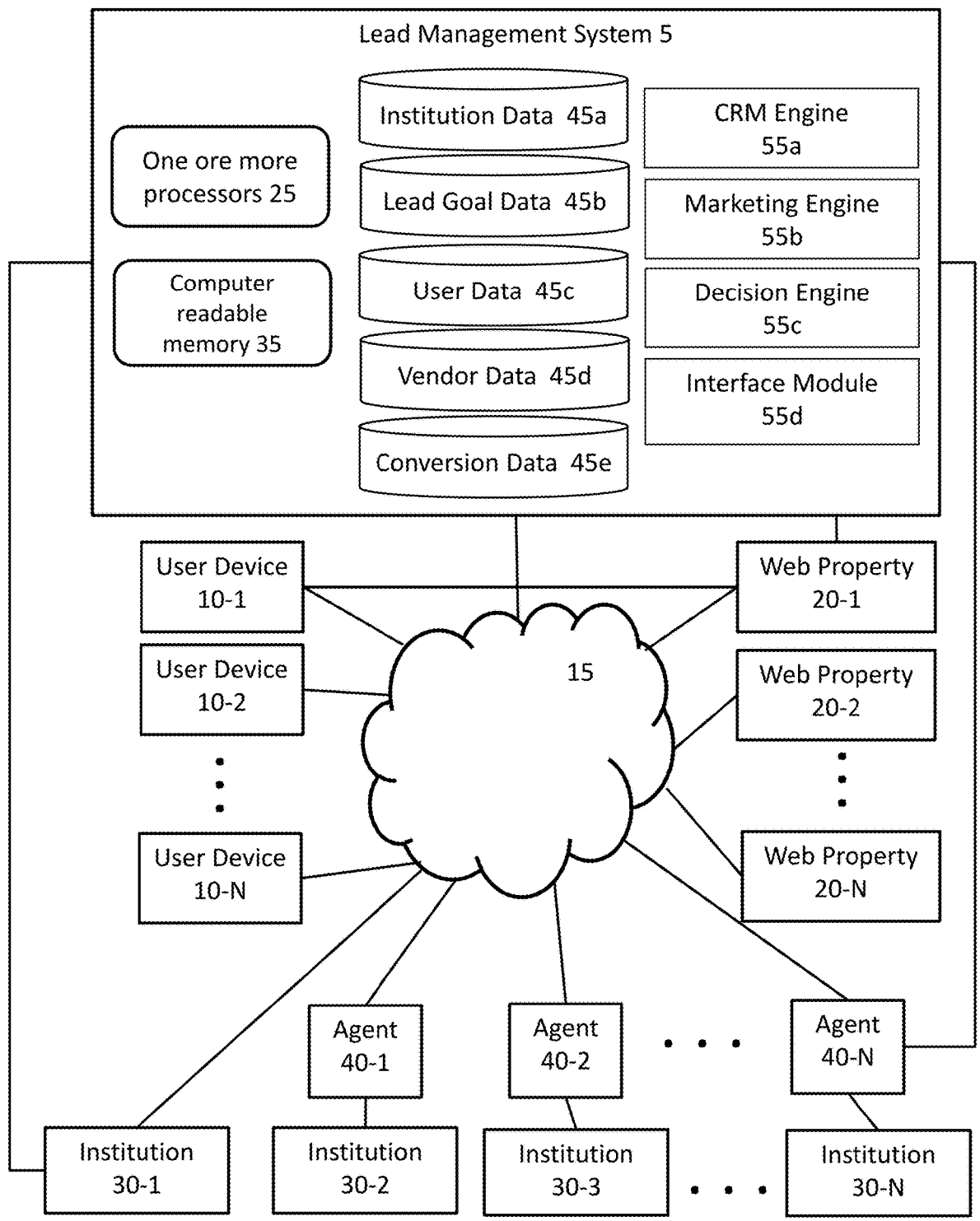
FIG. 1 is a system diagram illustrating a lead management system operatively connected to one or more user devices and one or more institutions according to an exemplary embodiment of the present disclosure.

According to exemplary embodiments, FIG. 1, shows a lead management system, generally designated by number 5. The lead management system 5 may operatively connect to one or more user devices 10-1, 10-2, . . . 10-N associated with one or more users. The user devices may include devices such as, for example, a laptop, desktop, smartphone, Blackberry, iPhone, iPad, Surface Tablet, tablet device, iPod, Android device, Windows 8 device, and the like. In embodiments, the user device 10 may be associated with the lead management system 5. For example, associated user devices may be owned, operated, or under the control of the lead management system 5 through a representative and/or employee of the lead management system 5. Such associated user devices may be customized with programs or functionalities described herein and may also include additional features, such as demos, presentations, videos, and the like, to induce people to use the lead management system 5 and find an educational match. In this regard, some associated devices may be located remotely to the lead management system 5, such as in a mall, a kiosk, a park, a call center, or any suitable public or commercial place. In embodiments, various aspects of the lead management system 5 may be implemented at one or more of the institutions.

The lead management system 5 may also operatively connect with one or more web properties 20-1, 20-2, . . . 20-N, via one or more networks 15, such as the Internet, a wide area network, a local area network, a telephone network, dedicated access lines, a proprietary network, a satellite network, a wireless network, a mesh network, or through some other form of end-user to end-user interconnection, which may transmit data and/or other information. In embodiments, the lead management system 5, and by extension, any one of its components, may be operatively connected to one or more networks 15. The one or more web properties 20, may rely, use, and/or implement one or more of the services or components of the lead management system 5, such as the engines 55.

In embodiments, user devices 10 may access the lead management system 5 through an interactive portal using a web browser without any additional or special software. In embodiments, user devices 10 may access the lead management system 5 through one or more web properties 20-1, 20-2, . . . 20-N external to the lead management system 5.

The lead management system 5 may operatively connect, directly and/or indirectly via a network 15 to one or more institution systems 30-1, 30-2, 30-3, . . . 30-N. The institution systems 30 may include one or more computer systems associated with one or more institution parties, such as, for example, educational providers, businesses, organizations, and the like. In exemplary embodiments, the lead management system 5 may provide a web portal, Application Program Interfaces ("APIs"), downloadable application, and/or other communications methods to interface with the one or more institutions 30. For example, an institution 30 may register and/or sign up with the lead management system 5 via the web portal, which may be implemented via a data services engine. The data services engine may comprise software and/or computer code executing computing steps on one or more processors.

In embodiments, the lead management system may be operatively connected to one or more agent devices 40-1, 40-2, . . . 40-N, which in turn may be operatively connected to one or more institution systems 30. In embodiments, agents of the institution may use the lead management system on behalf of their institution clients. For purposes of discussion, without limiting the scope of the invention, the present disclosure describes institutions interacting with the lead management system by inputting data, requesting data analysis, and modifying institution data, to name a few. The disclosure can encompass other actors interacting with the lead management system on behalf of the institution, such as agents, agent employees, and/or institution employees, to name a few.

The components of the lead management system 5 are shown to be located together in FIG. 1. It is to be understood that in embodiments the one or more components of the appointment system 5 may be combined or separated in any suitable manner. For example, one or more components may be located together on one or more computer systems that are operatively connected to other components of the lead management system 5.

In exemplary embodiments, the lead management system 5 includes and/or implements one or more engines 55 that may be implemented by one or more processors/computing devices associated with the lead management system 5. In this regard, the various aspects of the engines 55 may be implemented as computer software and/or portions of computer code, which may be stored on one or more non-volatile, non-transitory computer/processor readable storage media and implemented in one or more processors operatively connected thereto, and may be configured to enable, facilitate, and/or otherwise provide the input and/or output of data, e.g., via a user. In exemplary embodiments, each engine can be stored separately or in combination with one or more other engines on processor readable storage devices, which are operatively connected to one or more processors associated with the lead management system 5. Data may be stored in or accessed from non-transitory computer readable memory and/or in one or more databases.

In exemplary embodiments, the lead management system 5 may include a Customer Relationship Management ("CRM") engine 55a, a marketing engine 55b, and/or a decision engine 55c, to name a few. In embodiments, the CRM engine 55a may implement processes for managing, maintaining, collecting, inputting, securing access to, tracking and/or inputting user data, generating, analyzing, providing, and/or displaying lead data; and/or contacting and/or communicating with users. In embodiments, the marketing engine 55b may implement processes for managing, maintaining, collecting, inputting, securing access to, tracking and/or inputting vendor data, generating, analyzing, providing, and/or displaying lead data; and/or contacting and/or communicating with users. In embodiments, the decision engine 55c may implement processes for managing, maintaining, collecting, securing access to, and/or inputting institution data and/or generating, analyzing, providing, and/or displaying data such as lead data, cost data, vendor data and/or vendor performance data, to name a few.

In embodiments, the lead matching system 5 may also include a data services engine, a forms engine, a matching engine, or delivery engine, to name a few. For example, the data services engine may implement processes relating to managing, maintaining, collecting, and/or securing access to configuration data for institutions and/or users. The forms engine may implement processes relating to generating, providing, and/or displaying forms relating to institution and/or institutional offers. The matching engine may relate to implementing processes for matching one or more institutions with one or more users. The matching engine can implement business rules provided by the institution/organization during the matching processes. The delivery engine may implement processes for providing matching and/or other information to the users and/or institutions.

In exemplary embodiments, the lead management system 5 may include one or more electronic databases 45, stored on one or more processor readable storage devices, which may be operatively connected to the one or more engines 55. The databases may include institution data 45a, lead goal data 45b, user data 45c, vendor data 45d, conversion data 45e, and other data, stored on one or more non-volatile computer storage readable media. The institution data 45a may include various information regarding the institution. For example, in the case where the institution is educational, e.g., a college and/or university, the institution data 45a may include the institution name, campus locations, schools, offered programs, business rules, etc. In embodiments, the institution data 45a is stored by the lead management system 5 in one or more databases, linked with an account associated with a specific institution. In embodiments, the lead goal data 45b may comprise information relating to the lead management goals of the institution, such as institutional goals for lead acquisition and conversion. In embodiments, the lead goal data 45*b* may comprise the cost per lead ("CPL") and/or institutional limits per vendor, such as total dollar amount allocated to specific vendors for lead acquisition and/or total number of leads designated to be acquired by a specific vendor, to name a few. In embodiments where the institution is educational, e.g., a college and/or university, the lead goal data 45*b* may include cost per enrollment ("CPE"), enrollment rate goals, cost per contact, cost per interview, cost per application, or cost per start, to name a few.

The user data 45*c* may include information relating to the user, including, for example, name, age, address, contact information, financial information, preferences, etc. Similarly, in the context of an educational institution, the user data 45*c* may include educational background data, e.g., high school/college/graduate school accomplishments, grade-point-averages (GPAs), educational preferences, etc. In embodiments, the user data 45*c* is stored by the lead management system 5 in one or more databases, linked with an account associated with a specific user. The vendor data 45*d* may include information relating to vendors who operate web properties 20 to gather user data and/or leads, such as name, location, employee names, employee qualifications, employee contact information, and vendor performance data, to name a few. The conversion data 45*e* may include information relating to lead performance. In the context of education leads, the conversion data may comprise information related to the number of leads contacted by institution representatives, the number of leads interviewed by institution representatives, the number of leads who have applied for enrollment at the institution, the number of leads who have enrolled at the institution, or the number of leads who have started at the institutions, to name a few. In embodiments, the lead management system 5 may store other data needed by the lead management system 5.

Figure 2:
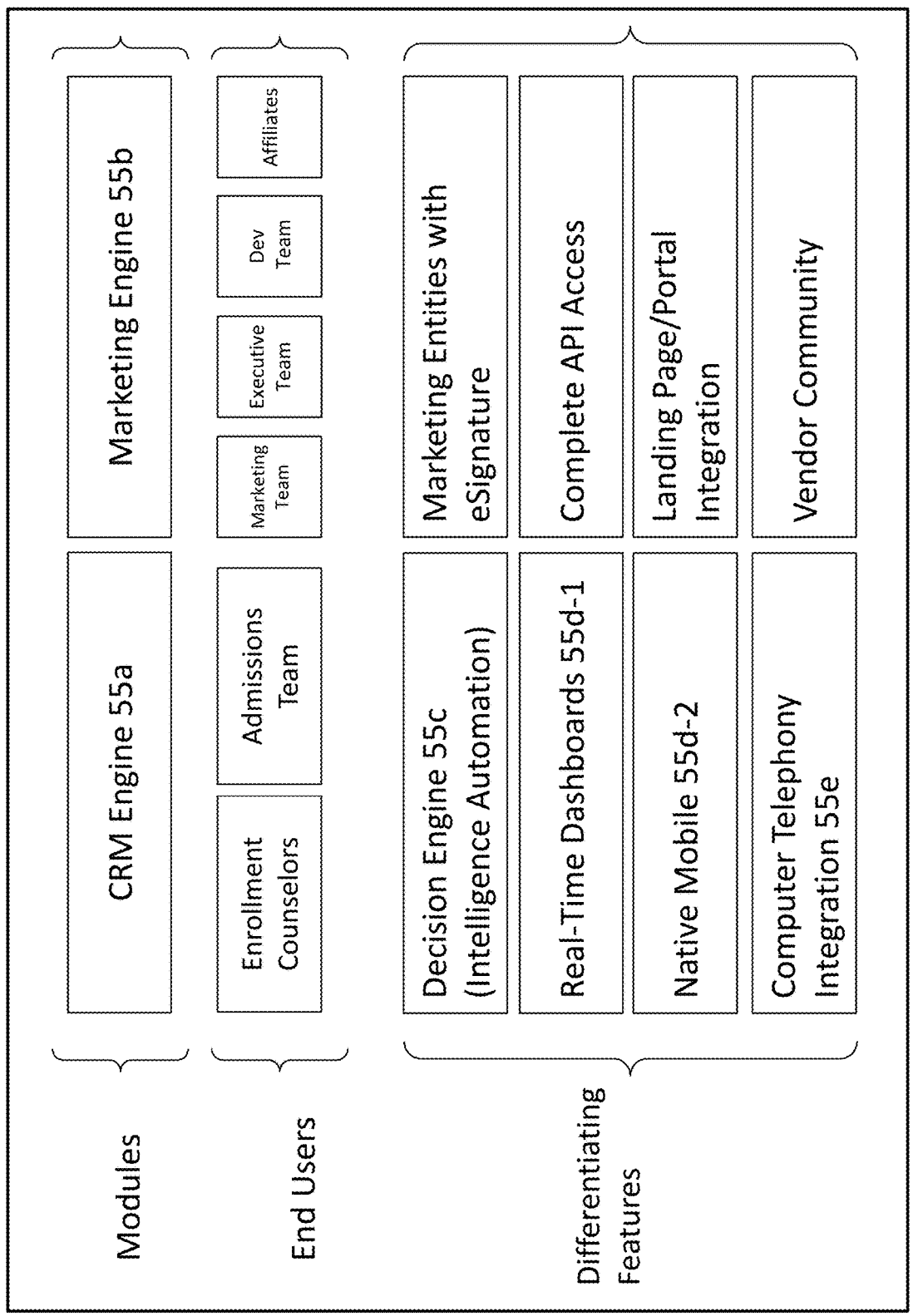
FIG. 2 is a diagram illustrating the features of an education lead management system according to an exemplary embodiment of the present disclosure.

FIG. 2 illustrates the features of an education lead management system according to an exemplary embodiment of the present disclosure. In embodiments, the education lead management system comprises a Customer Relationship Management ("CRM") engine 55*a*. In embodiments, the CRM engine 55*a* is utilized by end users, e.g., enrollment counselors and admissions teams, at the educational institution. In embodiments, the education lead management system comprises a marketing engine 55*b*. In embodiments, the marketing engine 55*b* is utilized by end users, e.g., a marketing team, executive team, development team, and/or affiliates, at the educational institution.

Still referring to FIG. 2, in embodiments, the education lead management system comprises a decision engine 55*c* and/or an interface module configured to display one or more real-time dashboards 55*d*-1. In further embodiments, the education lead management system comprises an interface module comprising an native mobile interface 55*d*-2, which may comprise a mobile application for use with a mobile device such as a smartphone, Blackberry, iPhone, iPad, Surface Tablet, tablet device, iPod, Android device, and/or Windows 8 device, to name a few, to access the lead management system 5. In further embodiments, the education lead management system comprises a computer telephony integration module 55*e*. In still further embodiments, the education lead management system comprises a module configured to allow the lead management system 5 to interact with marketing entities with eSignature. In still further embodiments, the education lead management system comprises a module configured to allow institutional users to access the Application Programming Interface ("API") through the lead management system 5. In still further embodiments, the education lead management system comprises an interface module configured to integrate the landing page and portal of the user interface. In still further embodiments, the education lead management system comprises a module configured to create a vendor community in the lead management system. Such a vendor community module may implement processes to allow for communication through the lead management system 5 among the associated vendors and between vendors and institutional users. Each of the aforementioned modules may comprise computer software and/or portions of computer code embodied in non-transitory computer-readable media and configured to enable, facilitate, and/or otherwise provide the input and/or output of data, e.g., via a user. Data may be stored in non-transitory computer readable memory and/or in one or more databases.

Figure 3:
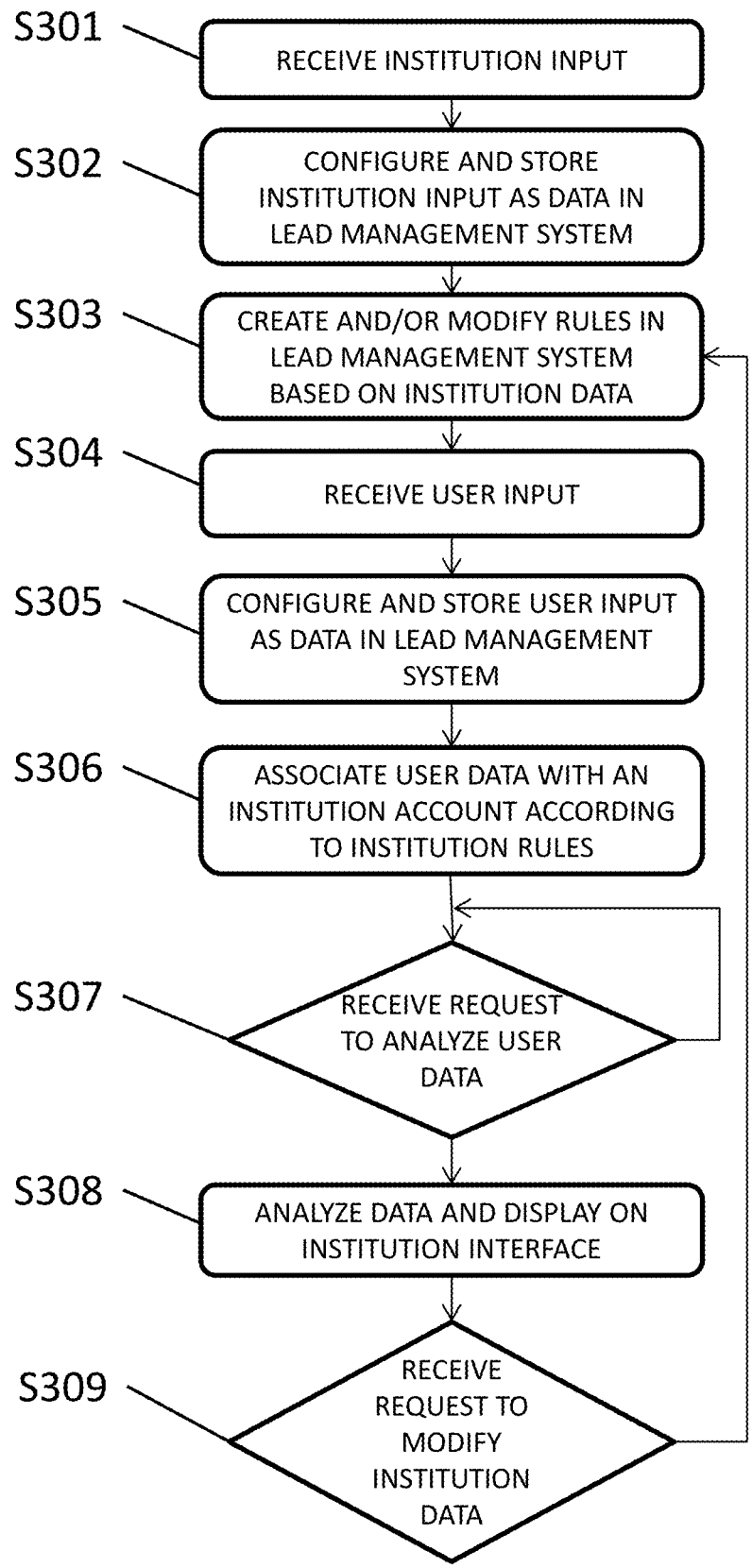
FIG. 3 is a flow chart illustrating an exemplary method for providing leads according to an exemplary embodiment of the present disclosure.

FIG. 3 illustrates a flowchart of an exemplary method for managing a lead management campaign via a lead management system. In a step S301, an institution inputs data into the lead management system. In embodiments, this data may include lead goal data 45*b*, such as cost per lead, cost per enrollment, and enrollment rate goals, to name a few, and/or institutional limits per vendor, such as total dollar amount allocated to specific vendors for lead acquisition and/or total number of leads designated to be acquired by a specific vendor, to name a few. In embodiments, the data input by an institution may include institution data 45*a* which, in the case where the institution is educational, e.g., a college and/or university, may include the institution name, campus locations, schools, offered programs, business rules, fill orders, delivery configurations, etc. In a step S302, the data input by the institution is configured and stored by one or more databases in the lead management system. In embodiments, the data is stored as a record in one or more databases linked to the institution account. In a step S303, rules for lead generation and acquisition are created and/or modified for the respective institution account based on the data input by the institution. In embodiments, these rules limit the user data that may be displayed to an institution via the user interface.

Still referring to FIG. 3, in a step S304, the lead management system receives user input. In embodiments, the lead management system may receive the user input directly from the user, or via a vendor or other intermediary. In a step S305, the user input is configured and stored by one or more databases in the lead management system. In embodiments, the data is stored as a record in one or more databases linked to the user account. In embodiments, the lead management system 5 tracks user behavior by updating the user account with additional data. For example, in embodiments, the lead management system tracks whether a specified user is contacted by an institution, interviewed by the institution, applies to an institution, enrolls at an institution, and/or starts at an institution, to name a few. In a step 306, the user data is associated with an institution account according to the institution rules created and/or modified in S303. In a step 307, the lead management system receives a request to analyze user data. In embodiments, this request may be generated by the institution user interacting with the lead management system institution interface. In a step 308, the lead management system analyzes user data and displays the results on the institution interface. In a step 309, the institution may request to modify the institution data 45*a* and/or lead goal data 45*b*. In embodiments, this request may be submitted by the institution through the user interface of the lead management system 5.

It will be understood that that any of the above steps and/or elements can be combined, separated, in any combination and/or separation thereof, and/or taken in any order. For ease, some of the steps are described as being sequential and/or in order. This is merely for ease and is not in any way meant to be a limitation.

Figure 4:
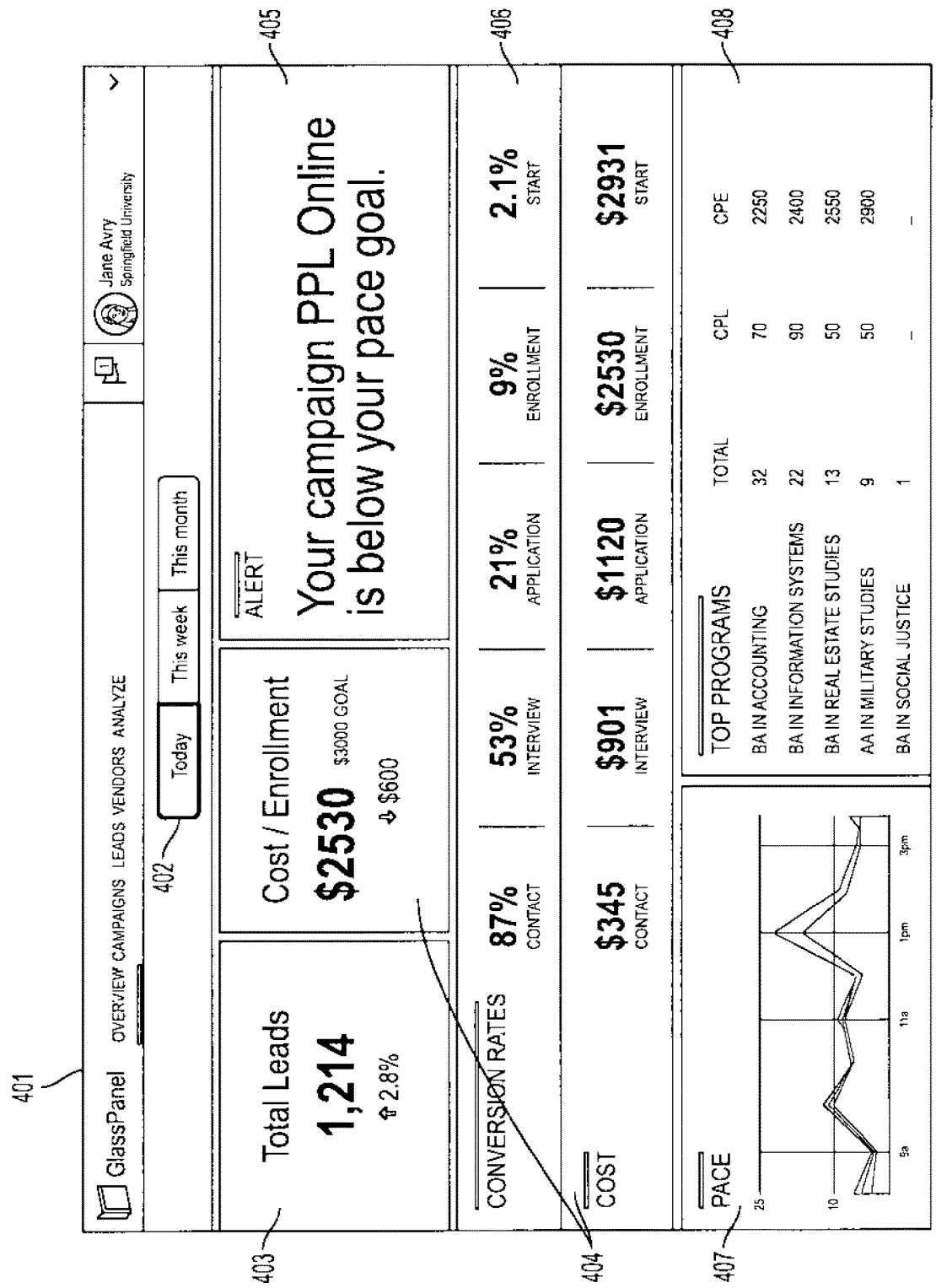
FIGS. 4-6 show an exemplary screenshots of interfaces according to an exemplary embodiment of the present disclosure.

FIG. 4 shows, according to an exemplary embodiment, an exemplary screenshot of an interface of a real-time dashboard implemented on a website associated with the lead management system 5. The functions of the interface may be achieved by use of, but is not limited to, one or more computers or computer systems having at least one or more processors, computer-readable memory comprising one or more databases, one or more communications portals for communicating with one or more other computers or computer systems, one or more input devices, and/or software embodied in non-transitory computer readable media and configured to enable, facilitate, and/or otherwise provide the input and/or output of data in one or more databases, e.g., via a user. In embodiments, navigation tools 401 may be provided for the user to navigate across interfaces and/or webpages of a website associated with the lead management system 5. In embodiments, the interfaces displayed by the lead management system may display data associated with the institution account, such as institution data 45a, lead goal data 45b, and/or conversion data 45d, to name a few. In embodiments, an institution may be required to enter login information specific to the institution account to access interfaces of the lead management system 5. In embodiments, the landing page for entering login information, and the portal of the user interface are integrated.

Still referring to FIG. 4, in embodiments, the user may adjust the data displayed by the real-time dashboard across time periods using a time selection tool 402. The display shows data calculated over the current day (i.e., today). Other available time periods may include one week, one month, one year, to name a few. In embodiments, the real-time dashboard display may include lead data 403, such as the total number of leads obtained in a given period (e.g., 1,214 total leads) and the percentage change of that value from the former period (e.g., +2.8%). In embodiments, the real-time dashboard display may include cost data 404, such as CPE data, cost per contact data, cost per interview data, cost per application data, cost per start data, or the percentage change of any cost value from the former period. In embodiments, the real-time dashboard display may include notification data 405, such as alerts based on institution data 45a and/or lead goal data 45b, input by the institution user. In embodiments, such alerts may relate to institution goals for lead generation recorded as lead goal data 45b, such as the CPE, total enrollment, or enrollment demographics, to name a few. In embodiments, the real-time dashboard display may include conversion rate data 406, such as the percentage of leads contacted by institution representatives, the percentage of leads interviewed by institution representatives, the percentage of leads who have applied for enrollment at the institution, the percentage of leads who have enrolled at the institution, or the percentage of leads who have started at the institutions, to name a few. In embodiments, the real-time dashboard display may include pace data 407, such as the rate of lead acquisition over time or a graph of lead acquisition over time, or various time periods. In embodiments, the real-time dashboard display may include lead demographic data 408, such as programs of study (e.g., accounting, information systems, real estate studies, military studies, or social justice) and associated CPL data and CPE data.

Figure 5:
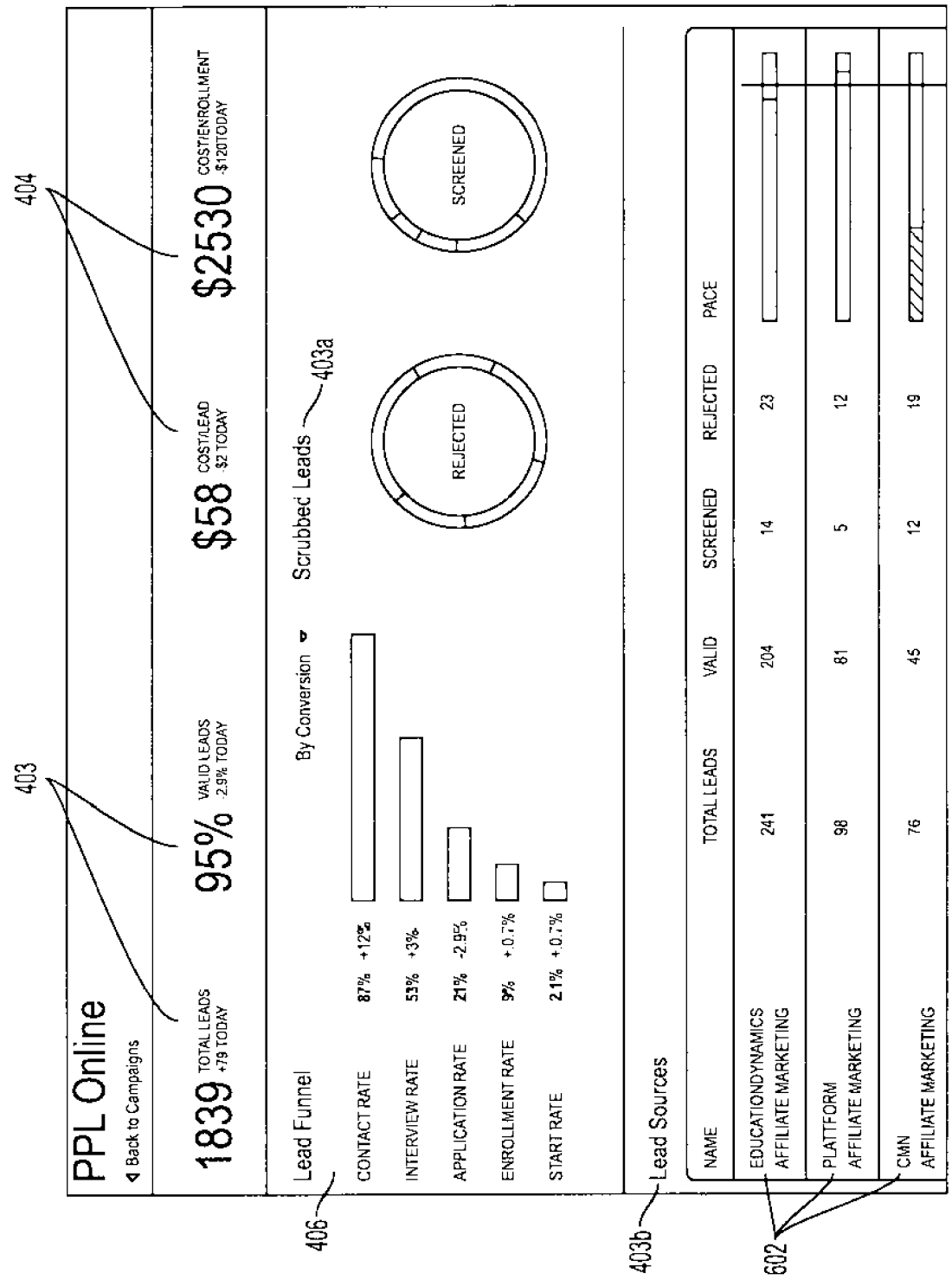

FIG. 5 shows, according to an exemplary embodiment, an exemplary screenshot of an interface implemented on a website associated with the lead management system 5. The functions of the interface may be achieved by use of, but is not limited to, one or more computers or computer systems having at least one or more processors, computer-readable memory comprising one or more databases, one or more communications portals for communicating with one or more other computers or computer systems, one or more input devices, and/or software embodied in non-transitory computer readable media and configured to enable, facilitate, and/or otherwise provide the input and/or output of data in one or more databases, e.g., via a user. In embodiments, a reporting view display shown by the interface may include lead data 403, such as the total number of leads obtained in a given period (e.g., 1,839 total leads) and the percentage of valid leads (e.g., 95% valid leads), and cost data 404, such as CPL data (e.g., $58/lead), CPE data (e.g., $2,530/enrollment), or the percentage or numeric change of any value from the former period. In embodiments, the lead data may include scrubbed lead data 403a, such as the number of rejected or screened leads, and lead source data 403b, such as vendor data 602 and lead data 403 corresponding to those vendors (e.g., total leads, valid leads, screened leads, rejected leads, or lead pace) itemized by vendor. In embodiments, the reporting view display may include conversion data 406, such as the percentage of leads contacted by institution representatives, the percentage of leads interviewed by institution representatives, the percentage of leads who have applied for enrollment at the institution, the percentage of leads who have enrolled at the institution, or the percentage of leads who have started at the institutions, or the percentage or numeric change of any of these values from the former period. In embodiments, the reporting view display is configured with a ranking tool such that the user may reorder the conversion data according to various criteria.

Figure 6:
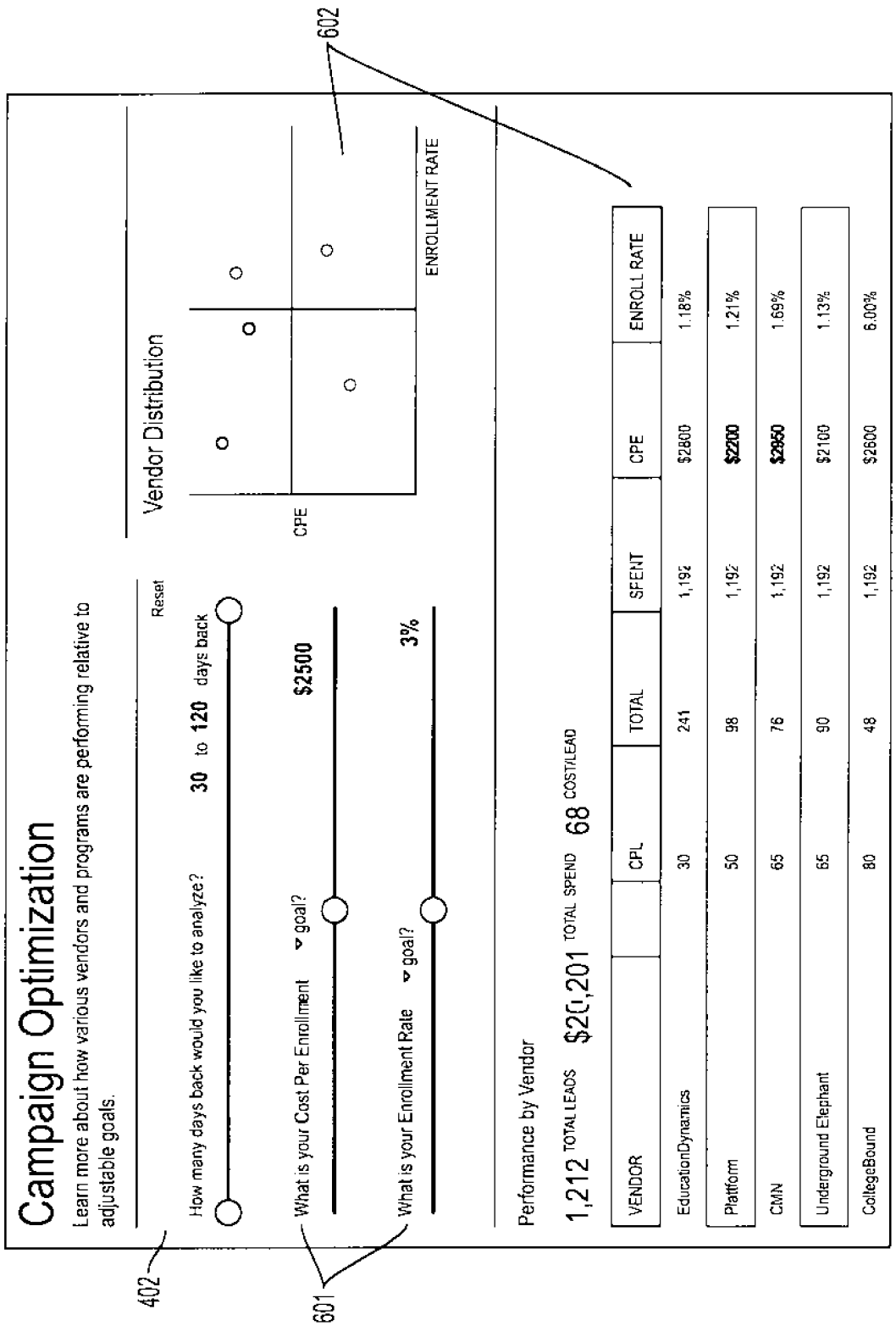

FIG. 6 shows, according to an exemplary embodiment, an exemplary screenshot of an interface implemented on a website associated with the lead management system 5. The functions of the interface may be achieved by use of, but is not limited to, one or more computers or computer systems having at least one or more processors, computer-readable memory comprising one or more databases, one or more communications portals for communicating with one or more other computers or computer systems, one or more input devices, and/or software embodied in non-transitory computer readable media and configured to enable, facilitate, and/or otherwise provide the input and/or output of data in one or more databases, e.g., via a user. In embodiments, the decision engine 55c comprises an interface with end user adjustable tools for campaign optimization. In embodiments, the user may adjust the data displayed by the decision engine display across time periods using a time selection tool 402. In embodiments, the decision engine 55c is configured such that an institution may adjust institutional goals (e.g., CPE and enrollment rate goals) using a goal input tool 601. In embodiments, the data input by the goal input tool 601 is stored as lead goal data 45b. In embodiments, the decision engine 55c is configured such that different values may be selected from a dropdown menu in the goal input tool 601. In embodiments, the decision engine display may display vendor data 602, such as graphing vendors relative to the values selected by the goal input tool (e.g., enrollment rate vs. CPE), and lead data, cost data, and conversion data, itemized by vendor.

In embodiments, the lead management system 5 may comprise machine readable instructions as a native mobile application. FIGS. 7A-7G show exemplary screenshots on a mobile device according to exemplary embodiments of the present disclosure. The functions of the mobile application interfaces described below may be achieved by use of, but is not limited to, one or more computers or computer systems having at least one or more processors, computer-readable memory comprising one or more databases, one or more communications portals for communicating with one or more other computers or computer systems, one or more input devices, and/or software embodied in non-transitory computer readable media and configured to enable, facilitate, and/or otherwise provide the input and/or output of data in one or more databases, e.g., via a user.

Figure 7A:
FIGS. 7A-7G show exemplary screenshots on a mobile device according to exemplary embodiments of the present disclosure.

FIG. 7A shows, according to an exemplary embodiment, an exemplary screenshot of a mobile application interface associated with the lead management system 5. In embodiments, the interface may comprise an institution campaign overview. In embodiments, the user may adjust the data displayed by the institution campaign overview display across time periods (e.g., the current day, one day, the current week, one week, the current month, one month, or one year) using a time selection tool 402. In embodiments, the institution campaign overview display may include notification data 405, such as alerts based on institution data, input by the institution user. Such alerts may relate to institution goals for lead generation, such as the CPE, total enrollment, or enrollment demographics, to name a few. In embodiments, the interface may comprise a settings tool 701 which may be used to navigate across interfaces and/or pages of a mobile application associated with the lead management system 5 or access an options tool whereby a user can change account preferences.

Figure 7B:

FIG. 7B shows, according to an exemplary embodiment, an exemplary screenshot of a mobile application interface associated with the lead management system 5. In embodiments, the user may adjust the data displayed across time periods (e.g., the current day, one day, the current week, one week, the current month, one month, or one year) using a time selection tool 402. In embodiments, the display may include cost data 404 (e.g., CPE data, cost per contact data, cost per interview data, cost per application data, or the percentage or numeric change of any value from the former period) and/or conversion rate data 406 (e.g., the percentage of leads contacted by institution representatives, the percentage of leads interviewed by institution representatives, or the percentage of leads who have applied for enrollment at the institution).

Figure 7C:
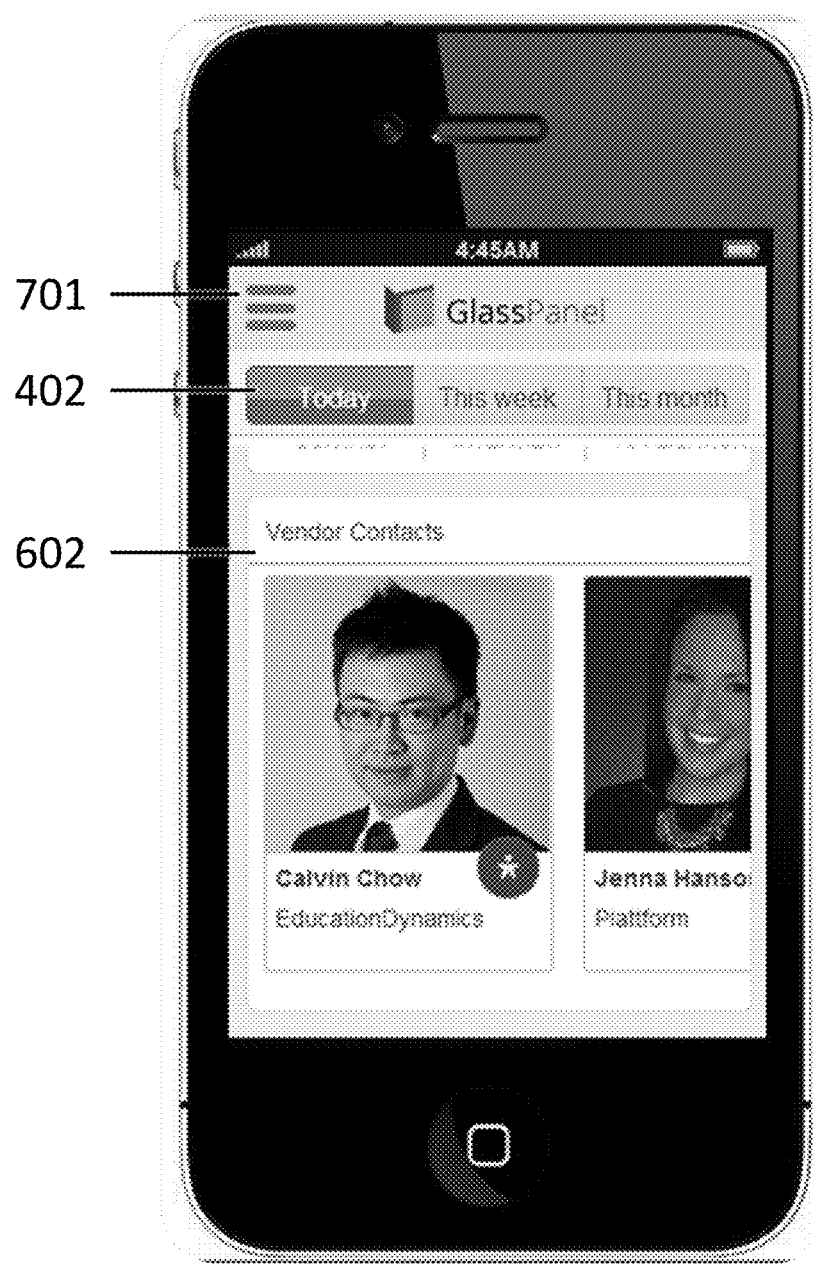

FIG. 7C shows, according to an exemplary embodiment, an exemplary screenshot of a mobile application interface associated with the lead management system 5. In embodiments, the display may include vendor data 602, such as vendor names, vendor contact information, or preferred vendors, to name a few.

Figure 7D:
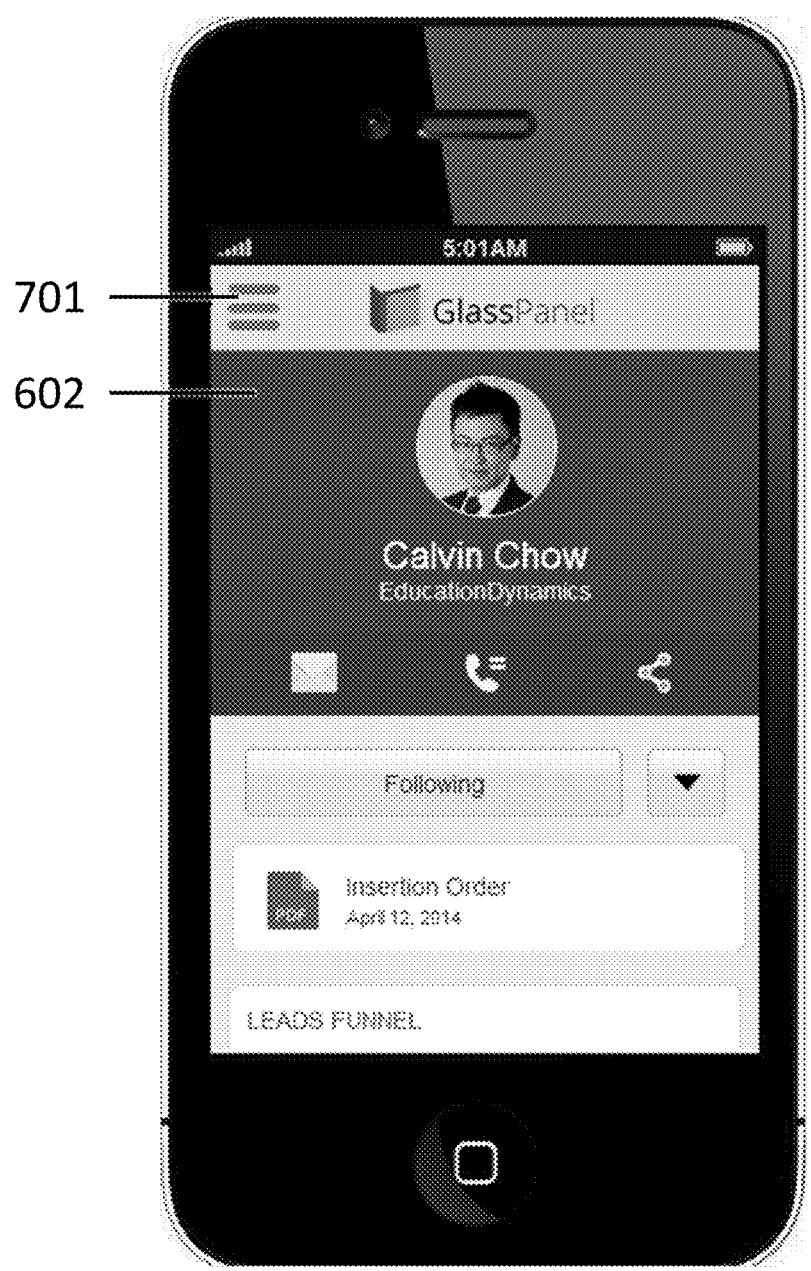

FIG. 7D shows, according to an exemplary embodiment, an exemplary screenshot of a mobile application interface associated with the lead management system 5. In embodiments, the display may include vendor data 602, such as for a specific vendor. In embodiments, the interface may be configured to provide a contact tools, such as links to other email, phone, text messaging, or other mobile applications to connect the user with the selected vendor. In embodiments, the display may show vendor data 602 filtered for a specific vendor, such as the users preference for the vendor, data input by the vendor to the lead management system, and cost data for the specific vendor, to name a few.

Figure 7E:
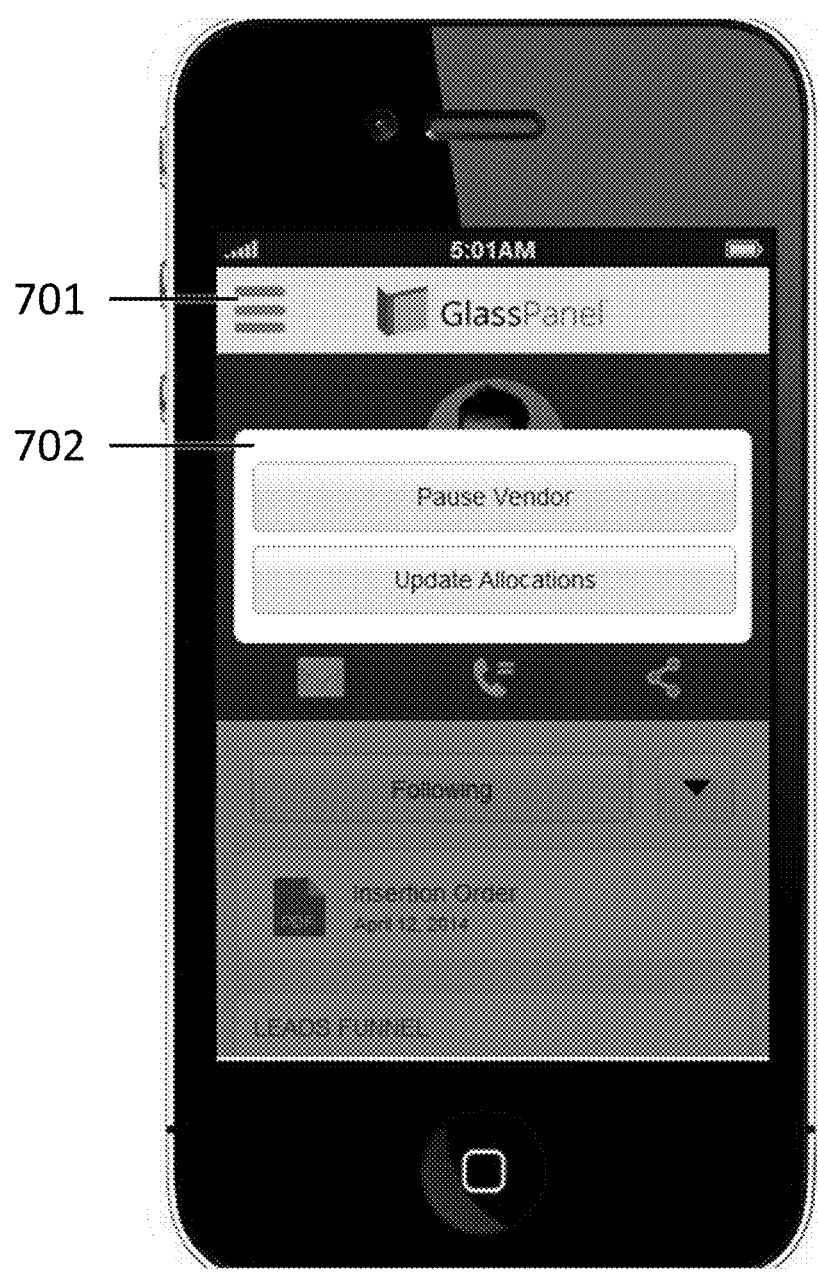

FIG. 7E shows, according to an exemplary embodiment, an exemplary screenshot of a mobile application interface associated with the lead management system 5. In embodiments, the interface may be configured to provide an options tool for the user, to change preferences for a specific vendor (e.g., choosing whether to accept leads from the specific vendor, or changing cost limits for the specific vendor).

Figure 7F:
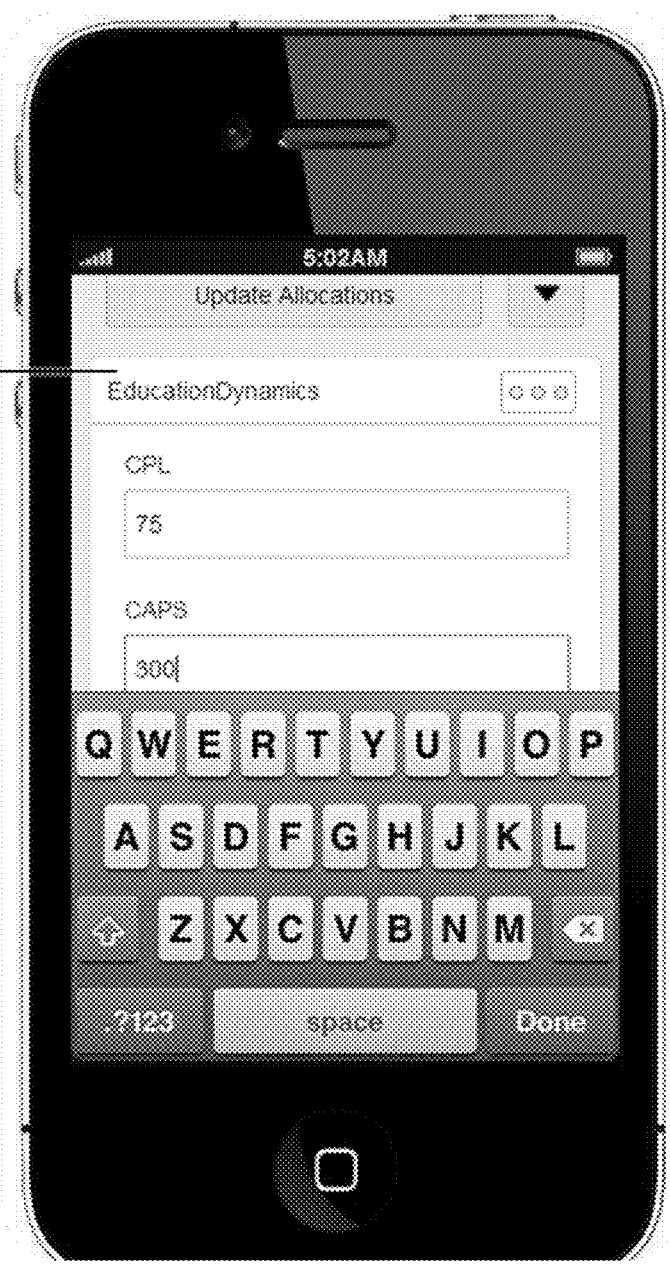

FIG. 7F shows, according to an exemplary embodiment, an exemplary screenshot of a mobile application interface associated with the lead management system 5. In embodiments, the interface may be configured to provide an options tool for the user, to change preferences for a specific vendor such as cost limits for the specific vendor (e.g., CPL data).

Figure 7G:
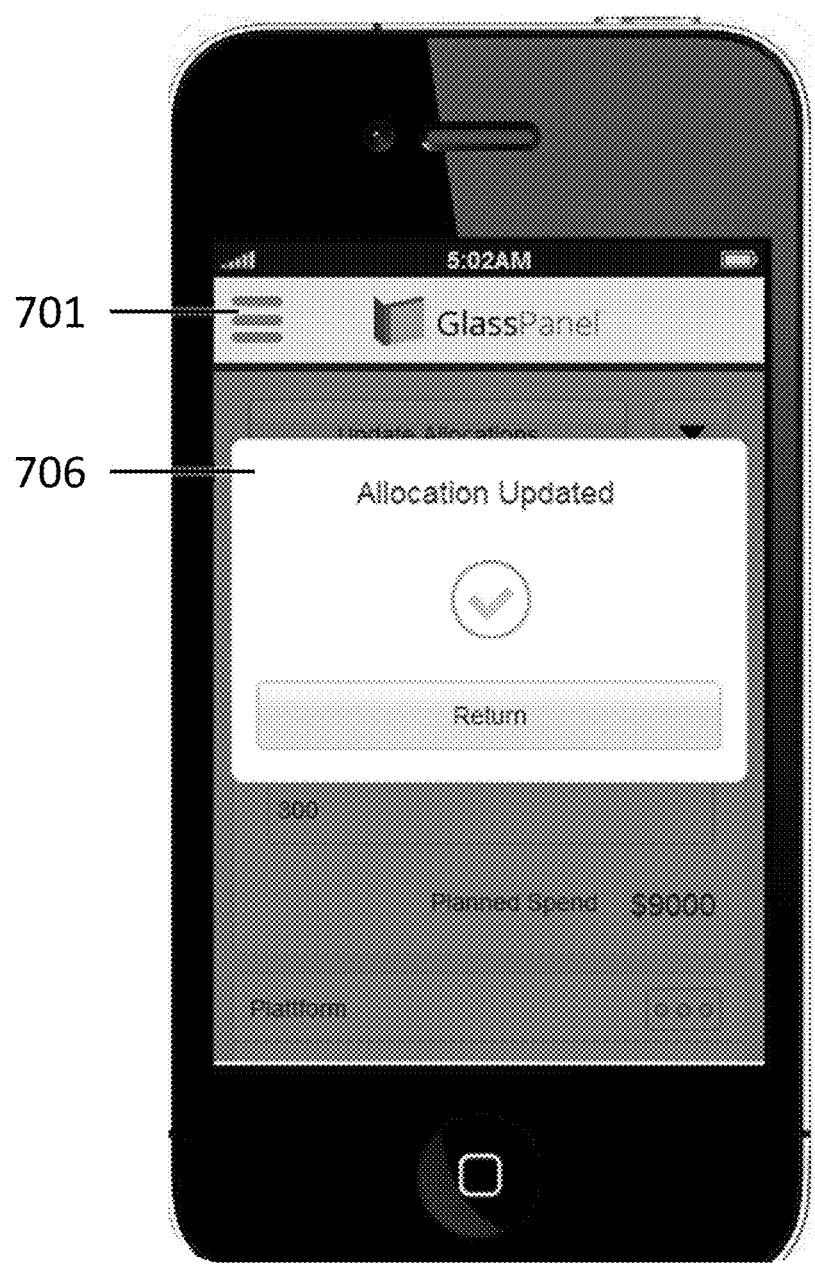

FIG. 7G shows, according to an exemplary embodiment, an exemplary screenshot of a mobile application interface associated with the lead management system 5. In embodiments, the interface may be configured to show a verification screen after the user changes preferences for a specific vendor, such as cost limits for the specific vendor, using the options tool.

Figure 8A:
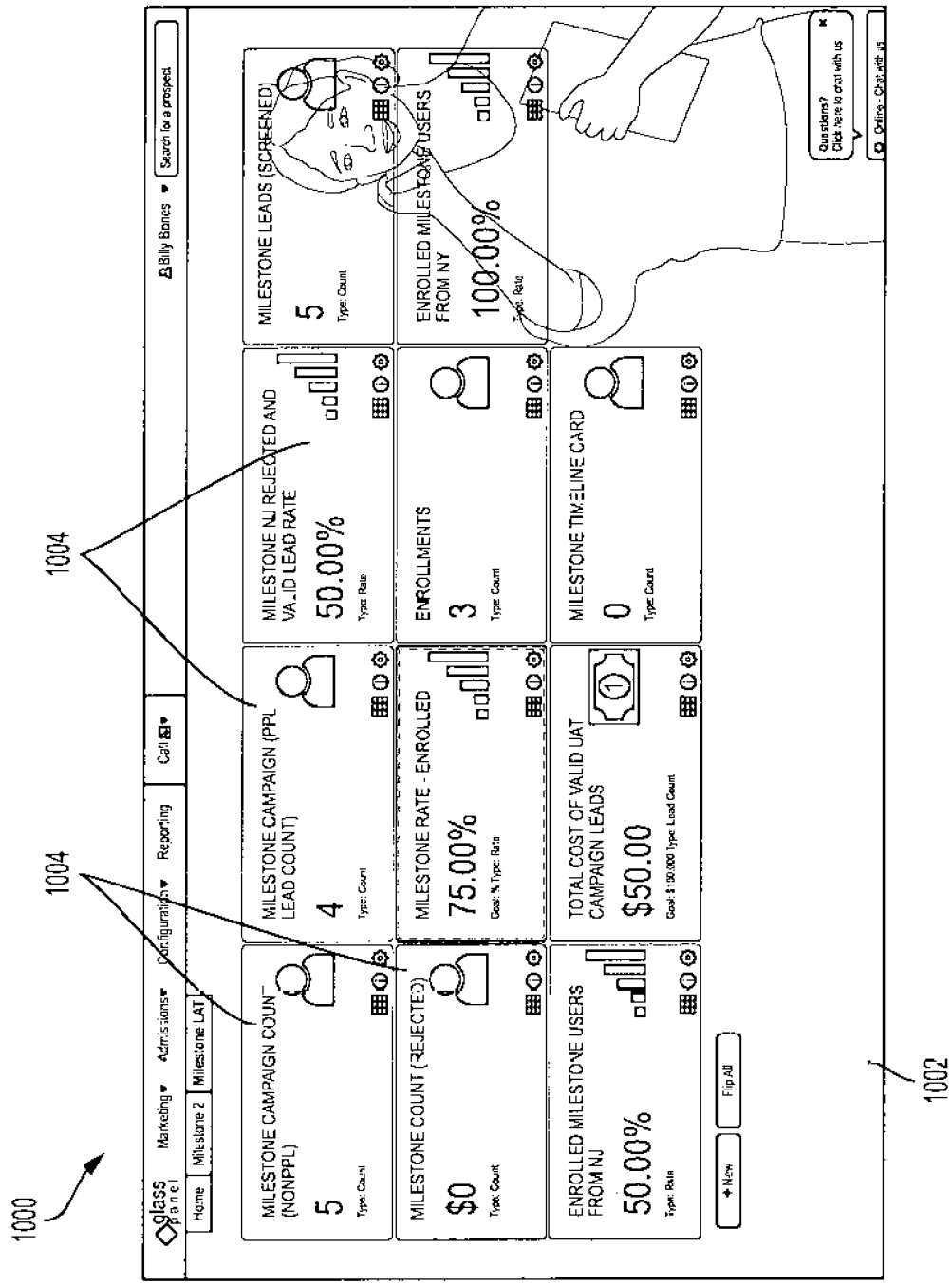
FIGS. 8A and 8B show exemplary screenshots of a dashboard of a graphical user interface according to an exemplary embodiment of the present invention.
Figure 8B:
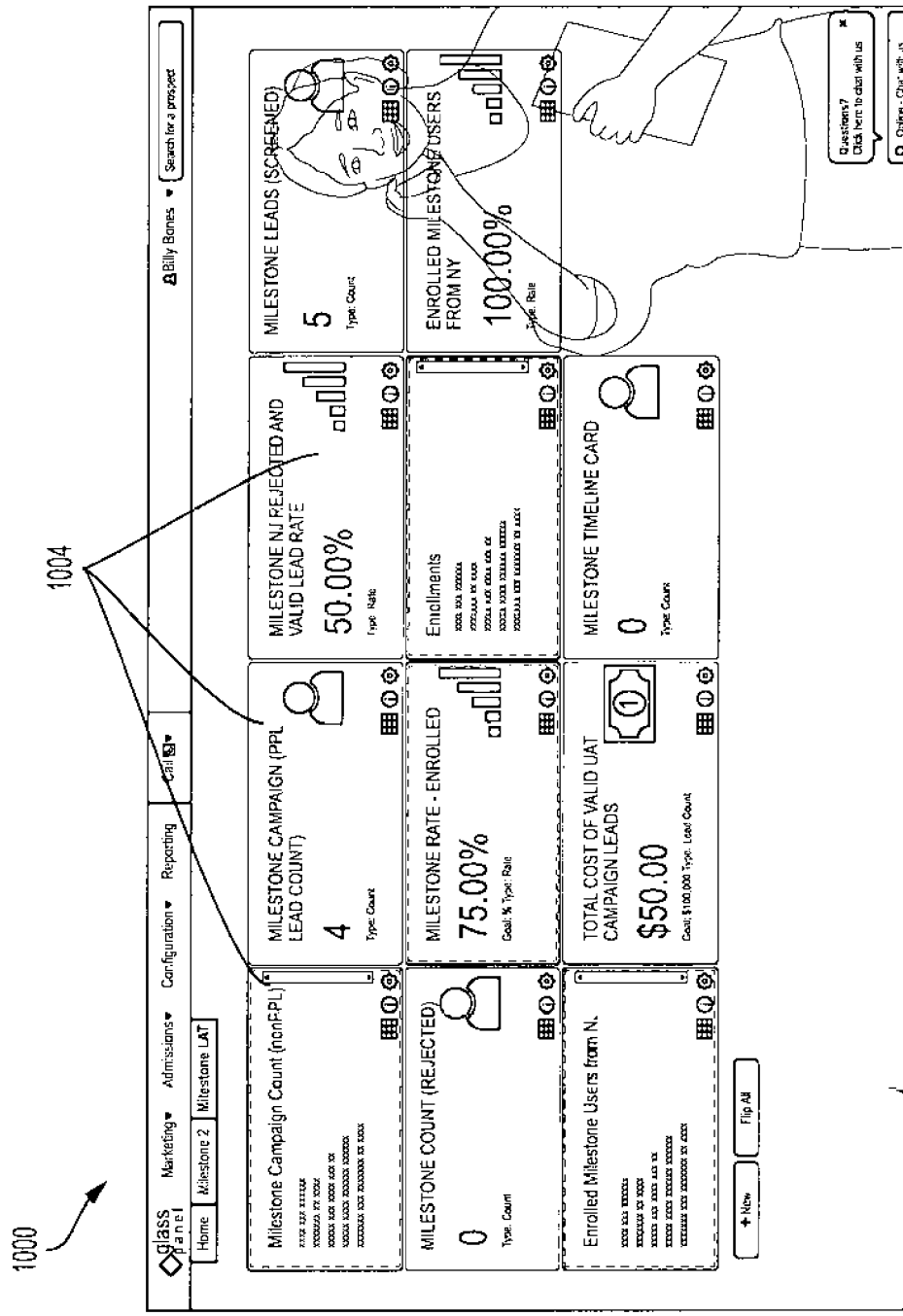

FIGS. 8A and 8B show screenshots of a dashboard of a graphical user interface, generally designated by reference number 1000, according to an exemplary embodiment of the present invention as generated by the lead management system 5. In this regard, the lead management system 5 may transmit a graphical user interface viewer application to one or more user devices so that users can access, manipulate and/or reconfigure data displayed at the user devices in the graphical user interface 1000. As explained in more detail below, the graphical user interface 1000 in this embodiment includes a dashboard 1002 made up of a number of configurable electronic cards 1004 that display specific metrics so that the graphical user interface 1000 functions as business intelligence tool. The graphical user interface 1000 enhances the speed, accuracy and usability of conventional business intelligence tools by providing a configurable display of dynamically updated data in the organized and efficient manner provided by electronic cards.

The electronic cards 1004 may be moved around by the user and arranged in groups that are relevant to the user and their workflows. Since users may have different workflows at different times of the month, the groups allow similar cards to be accessed together without cluttering the dashboard 1002. As shown in FIG. 8A, the electronic cards 1004 may display data related to one or more of the following: count (counts the number of inquiries specified by the filter setting on the card); total cost (total cost calculated for all inquiries specified by the filter setting on the card); rate (the percentage of some attribute that a group of inquiries possess); CPx (the cost per a specific attribute out of a set of inquiries specified by the filter setting on the card); CPL (the cost per inquiry given the set of inquiries filtered by the card); average time (the average time that inquiries within the filter took to move from one status state to another). More specifically, for each campaign (in the example shown in FIGS. 8A and 8B, the campaign is defined as "Milestone Campaign"), electronic cards may be configured to display data related to counts of the number of leads, percentages of leads that meet certain attributes (e.g., percentage rate of leads enrolled or from a specific geographical location) and the cost per valid lead, to name a few examples.

As shown in FIG. 8B, each electronic card 1004 may be manipulated within the dashboard 1002, and for example may be "flipped" to display the filter configuration for the card, the type of card configured and a drill-down to the data that the number shown on the front of the card represents. In an exemplary embodiment, each electronic card 1004 includes icons that can be selected to reconfigure the manner in which the card is displayed and, as explained further below, to access additional data pertaining to the data displayed on the card. As explained in more detail below, goals can be set for each dashboard card 1004 to reflect the target value being sought for the key performance indicator returned on the front of the card. Users can specify color values and thresholds so that when the value on the front of the card passes a certain level (e.g., greater than, less than, greater than or equal, less than or equal) the card changes colors to indicate the threshold has been passed. It should be appreciated that the threshold indicator is not limited to color changes, but other indicators may be used, such as, for example, a change in size or brightness of the card or animated effects.

Figure 9A:
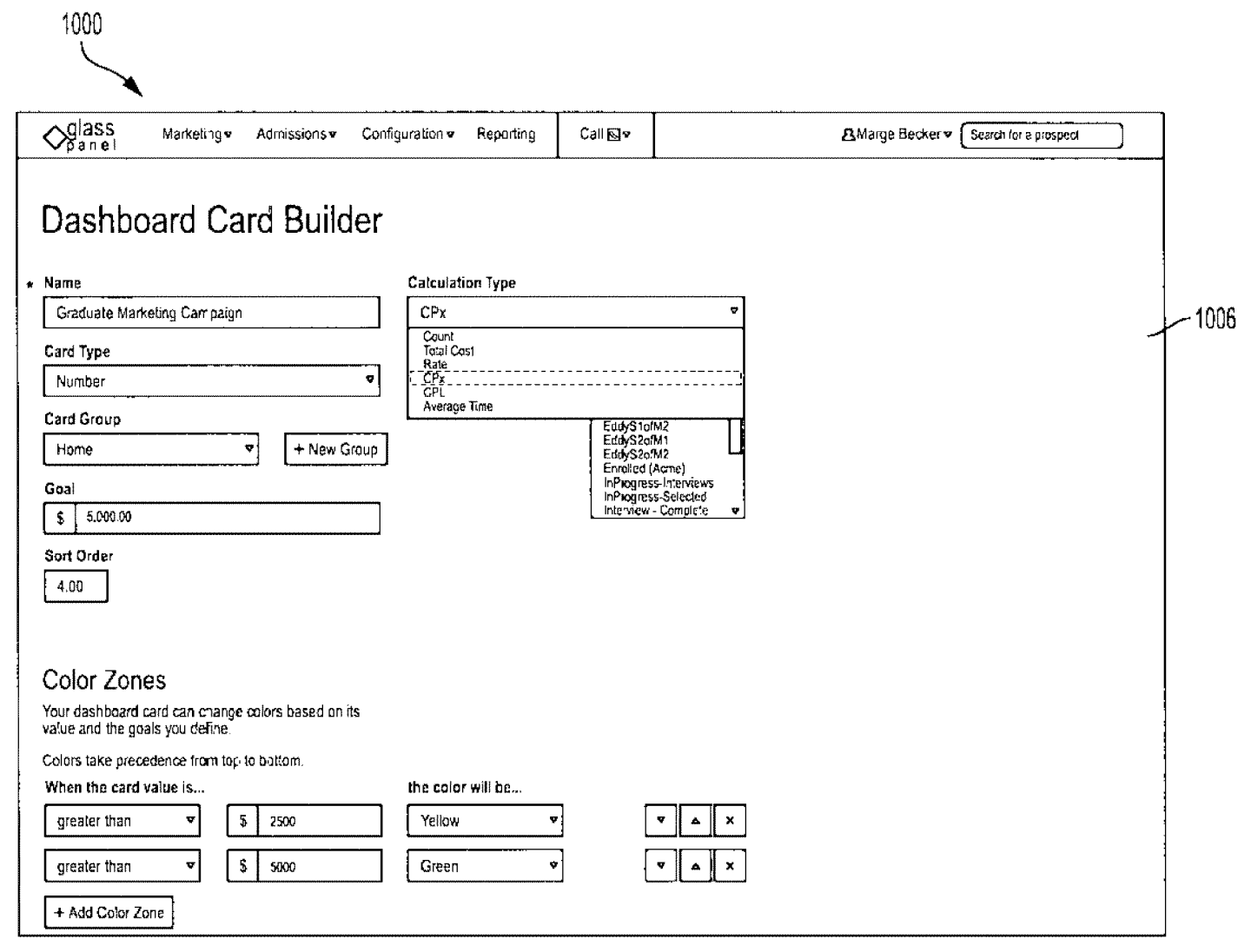
Figure 9B:
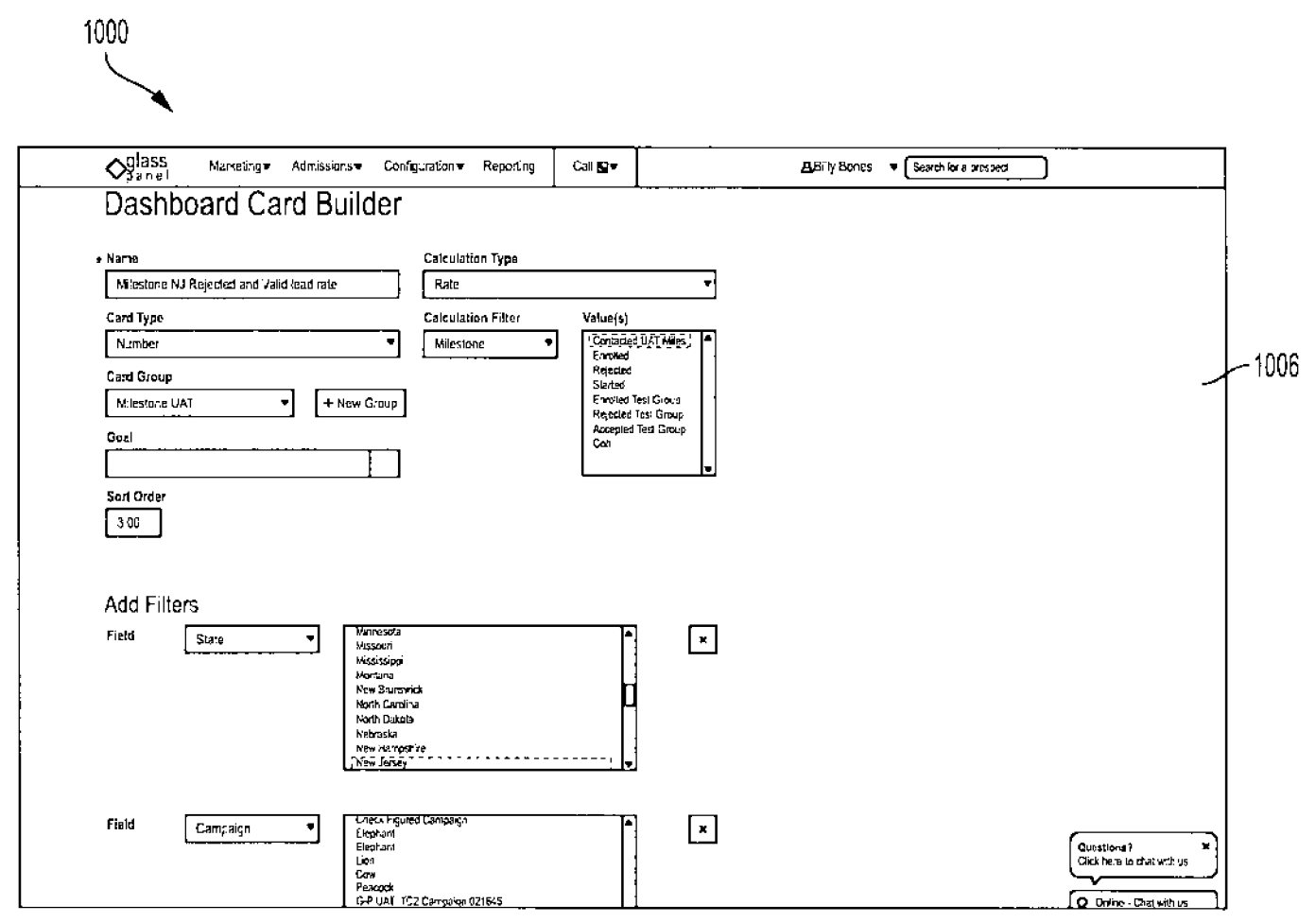
Figure 9C:
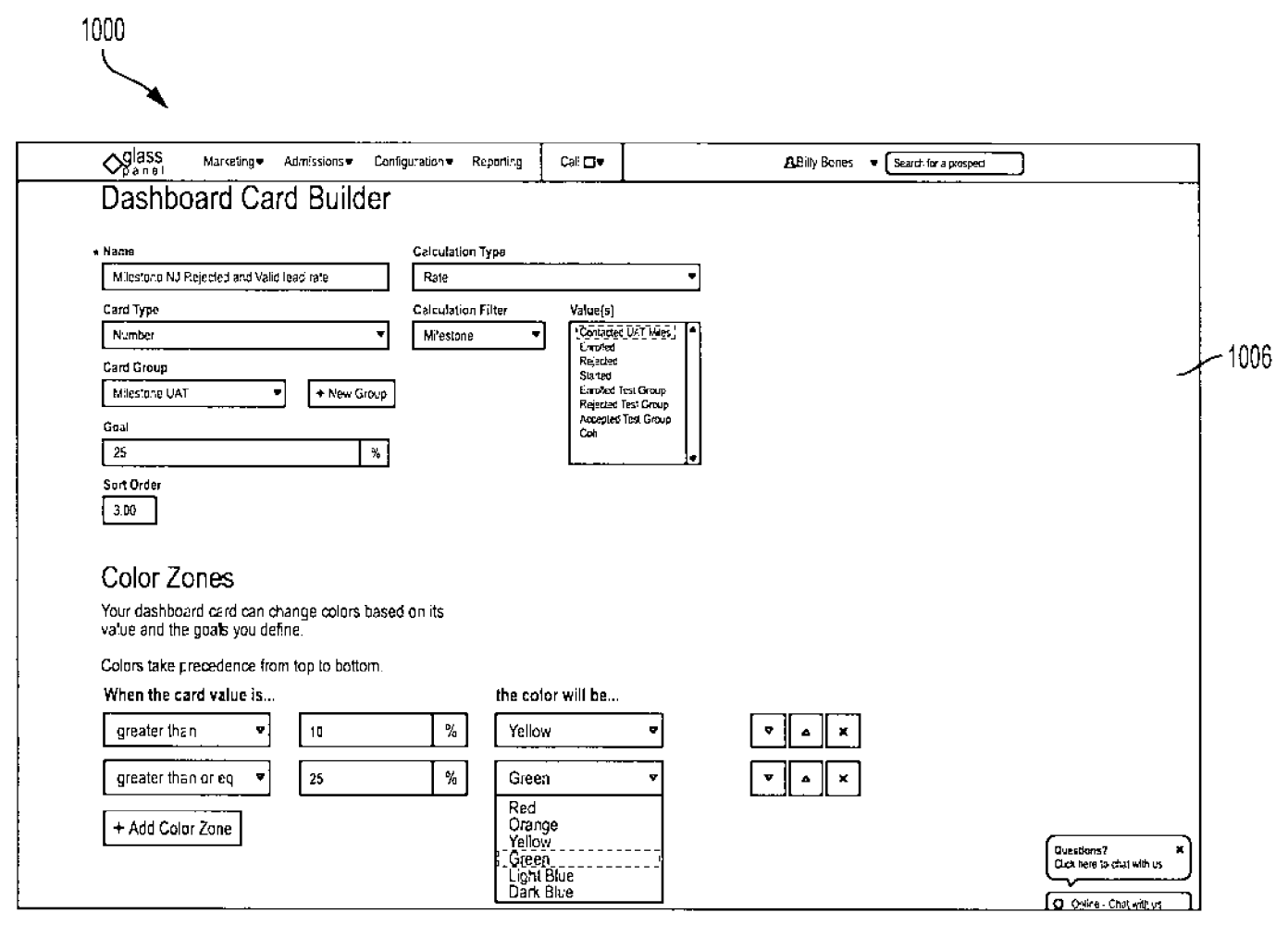

FIGS. 9A-9C show screenshots of a dashboard card builder 1006 of the graphical user interface 1000 as generated by the lead management system 5. The dashboard card builder 1006 includes various fields and drop down menus that allow users to define the type of data to be displayed on each electronic card 1004. For example, the dashboard card builder 1006 may include fields that allow for input of data related to, for example, name of the campaign, card type (e.g., number), calculation type (e.g., count, total cost, rate, CPx, CPL, Average Time), card group (e.g., users can define groups to which one or more cards belong), goal (e.g., a dollar amount or percentage) and sort order (i.e., where the card is to be displayed relative to other cards in the dashboard 1002). The dashboard card builder 1006 may also allow for user definition of color zones or other threshold indicators that set the manner in which a card indicates a threshold has or has not been met. For example, as shown in FIGS. 9A and 9C, a card may be displayed in one color if the card value is below a predefined threshold and may be displayed in another color if the card value is above the same or another predefined threshold. Also, as shown in FIG. 9B, filters may be added that further define the data displayed by a card, such as, for example, a specific geographical region or campaign to which the data is limited.

Figure 10:
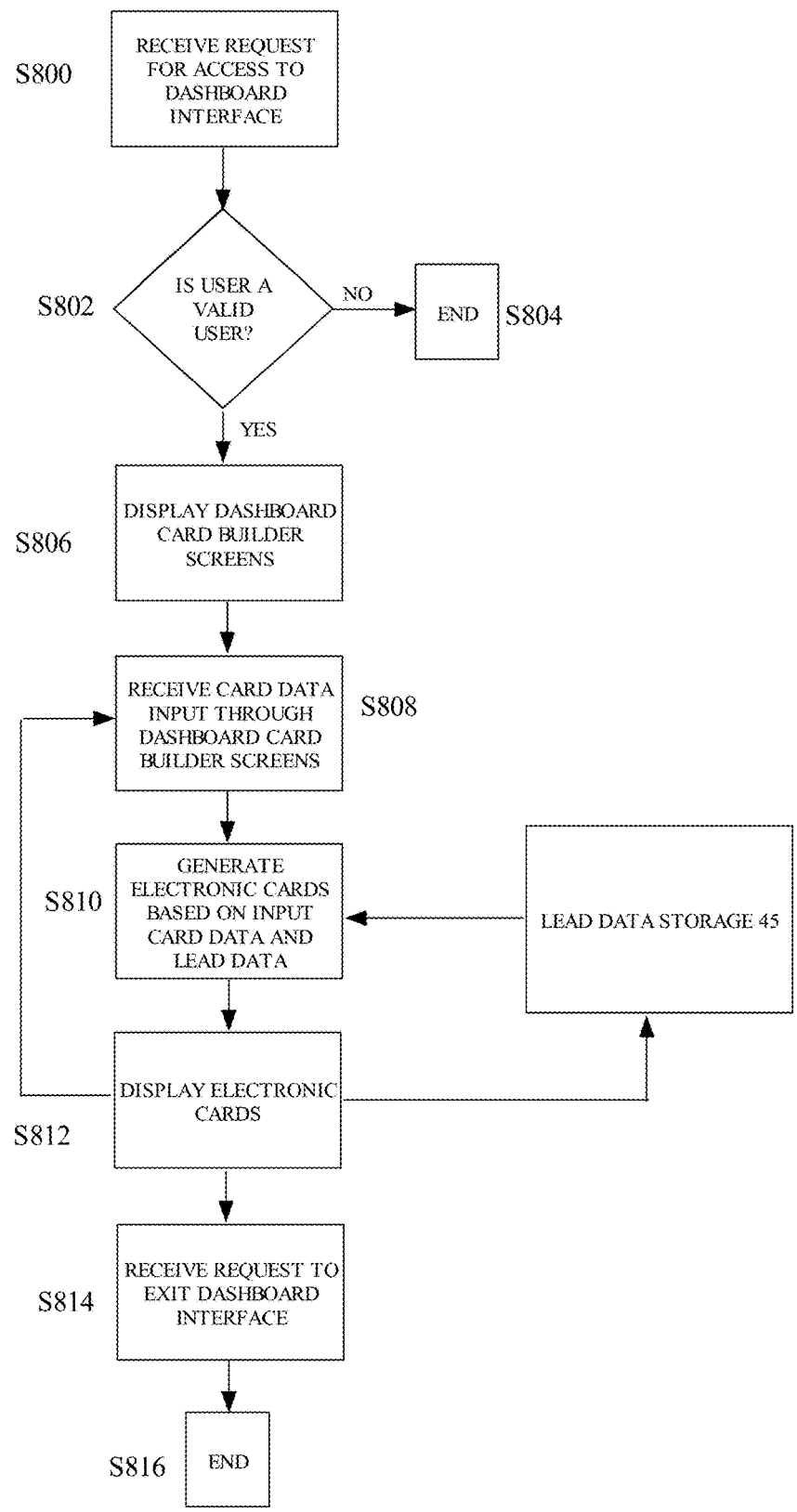
FIG. 10 is a flowchart illustrating a method of generating a graphical user interface according to an exemplary embodiment of the present invention.

FIG. 10 is a flowchart illustrating a method for generating the various screens of the graphical user interface 1000 according to an exemplary embodiment of the present invention. As discussed, the lead management system 5 may include an interface module, and the various steps as described with respect to FIG. 10 may be implemented by the interface module as well as other modules of the lead management system 5 to generate the various screens of the graphical user interface 1000. In this regard, in step S800 of the process, the interface module may receive a request from a user device to access the graphical user interface 1000. Such request may be received through, for example, a web or internal network portal, and may be in the form of an authentication request. In this regard, at step S802, the interface module may request input of identification data, such as, for example, a password, a user name or an electronic fingerprint. If the user can not be verified, the process may end at step S804.

Otherwise, in step S806, the interface module may display the dashboard card builder 1006. The steps may include sub-steps that determine whether electronic cards already exist for the user, in which case those cards would be displayed initially via the dashboard 1002 and the user would be provided the option to modify the existing cards, add new cards or remove cards via the dashboard card builder 1006.

In step S808, the interface module receives from the user device the electronic card data, and in particular the electronic card data is input via the dashboard card builder 1006. As previously described, the dashboard card builder 1006 may include fields that allow for input of data related to, for example, name of the campaign, card type, calculation type, card group, goal, sort order, threshold indicators and data filters.

In step S810, the interface module may generate the electronic cards based on the data received in step S806 as well as data obtained from the electronic databases 45 of the lead management system 5. As discussed, the databases 45 may include institution data 45a, lead goal data 45b, user data 45c, vendor data 45d, conversion data 45e, and other data, stored on one or more non-volatile computer storage readable media.

In step S812, the electronic cards generated in step S808 may be displayed in the dashboard 1002 with each card displaying the appropriate data as defined via the dashboard card builder 1006 and as gathered from the electronic databases 45. In this regard, step S810 may include sub-steps that involve a computer processor calculation of data to be displayed on the one or more electronic cards, where such calculation is based on the data stored in the databases 45. For example, a calculation may be performed to determine percentage of enrollments based on stored data related to the number of leads and the number of enrollments. As shown by the arrows going to data storage 45, the interface module periodically monitors the data storage 45 so that the data for display on the electronic cards is dynamically updated. Such updates may occur on a periodic basis of, for example, seconds, minutes or hours.

In step S814, the interface module may receive a request for the user device to exit the interface 1000, at which point the process ends at step S816.

Figure 11A:
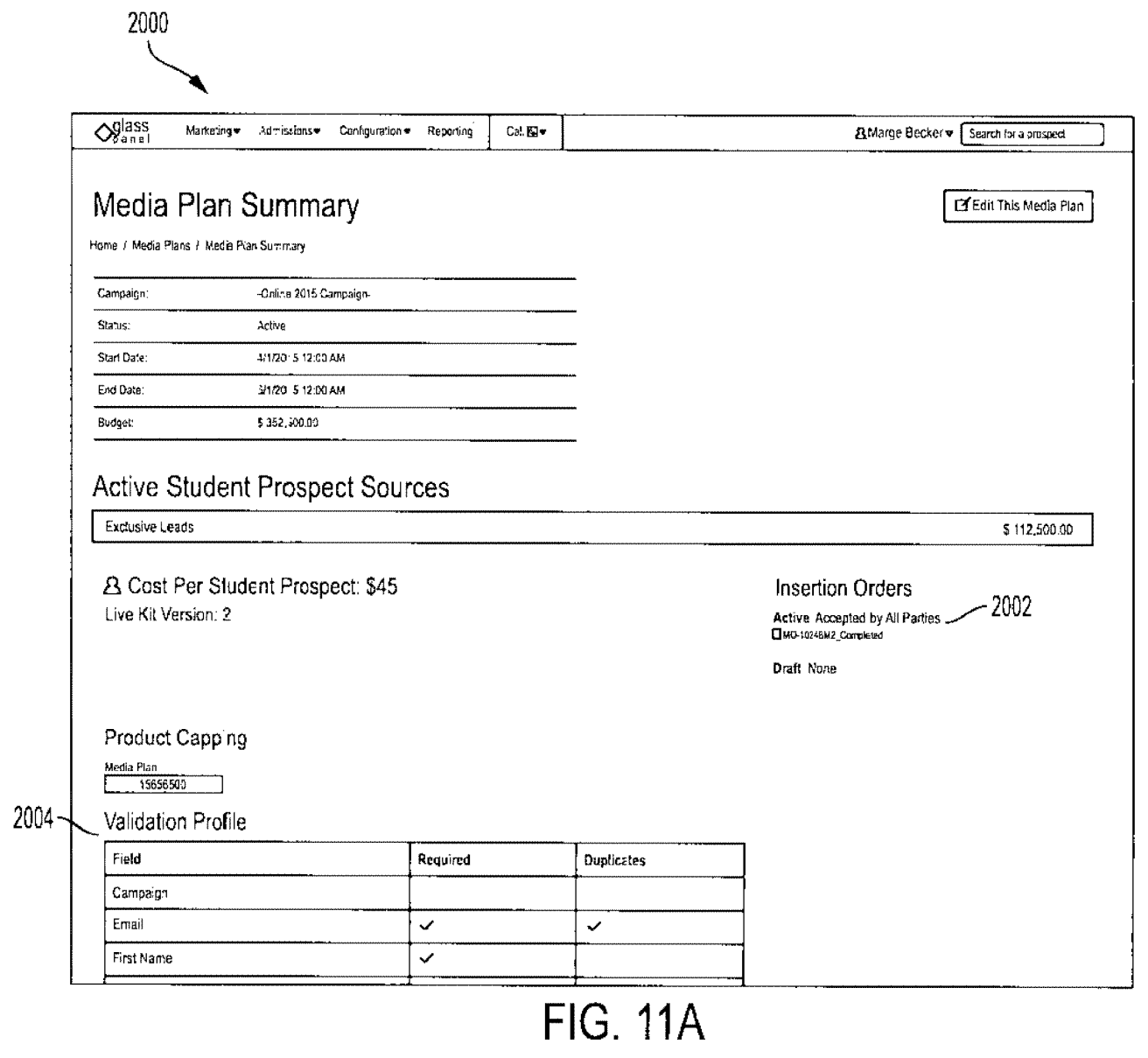
Figure 11C:
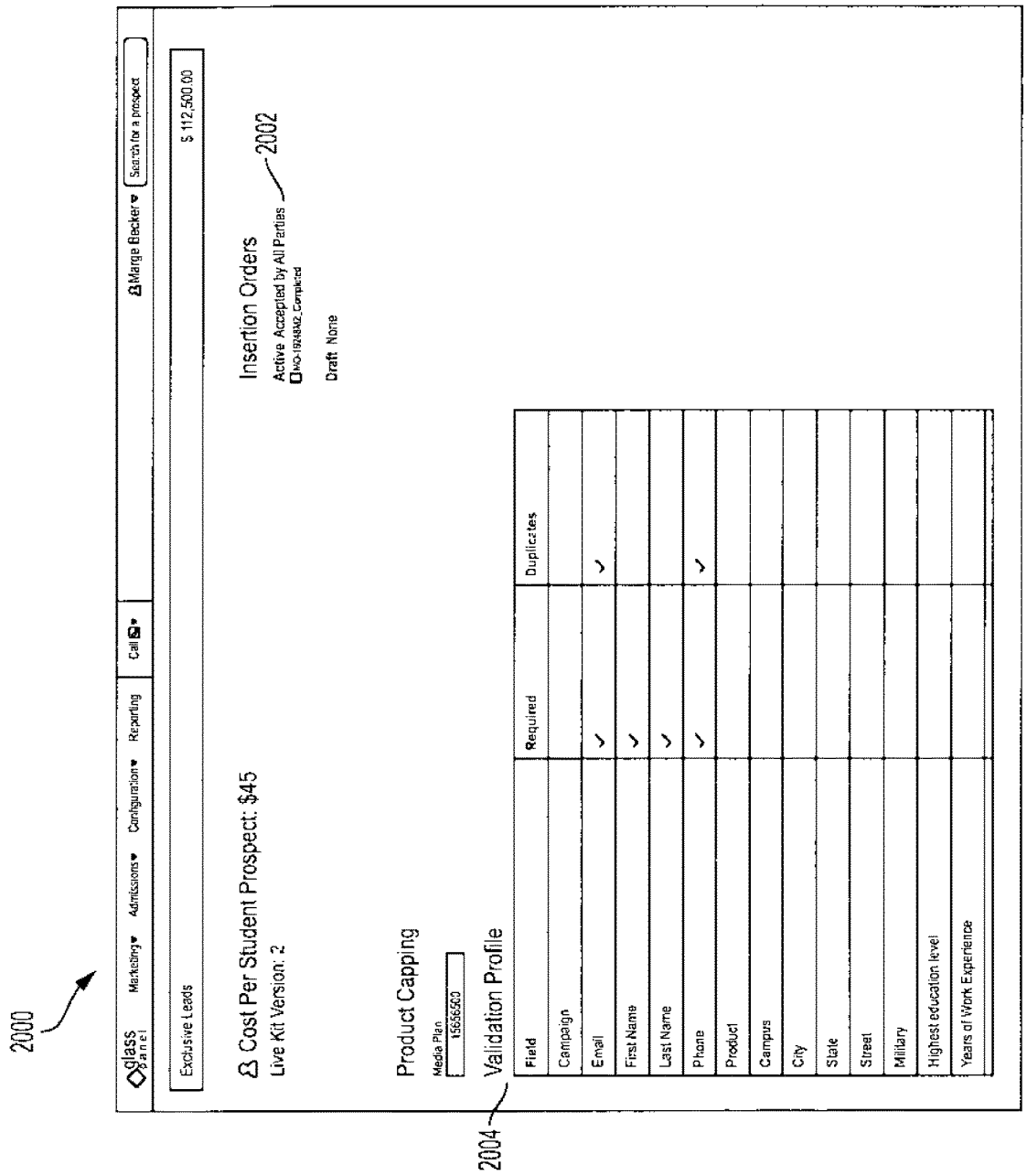

FIGS. 11A-11C shows a screen shot of a media plan builder interface, generally designated by reference number 2000, according to an exemplary embodiment of the present invention. The media plan builder interface 2000 provides a consolidated view of inquiry sources that are part of an active media plan. In this regard, the media plan builder interface 2000 may allow a user to set parameters for a campaign, such as, for example, status of the campaign (e.g., active or inactive), the start/end dates and a budget. The campaign may involve one or vendors and the media plan builder interface 2000 may allow a user (e.g., an educational institution) to generate insertion orders 2002 with the one or more vendors that define specific vendor service parameters, execute the insertion order and implement the insertion order in accordance with its terms. In this regard, the insertion order may define vendor service parameters, such as, for example, cost per lead, the manner in which leads are to be delivered and a validation profile 2004 that defines the terms of a valid lead, to name a few. In terms of student prospects, the validation profile 2004 may require delivery of contact information for the lead (e.g., phone number, e-mail address, mailing address, city, state, zip code, etc.), an identification of the lead (e.g., a first name and/or a last name) and specific lead attributes (e.g., military service, education level, amount of work experience, etc.). The validation profile 2004 may also allow for a duplicate check on each lead in that, for example, data pertaining to information for each lead may be compared with previous lead data to determine if the lead is a duplicate. The duplicate check may be performed back to an earlier date as specified by the user.

Figure 12A:
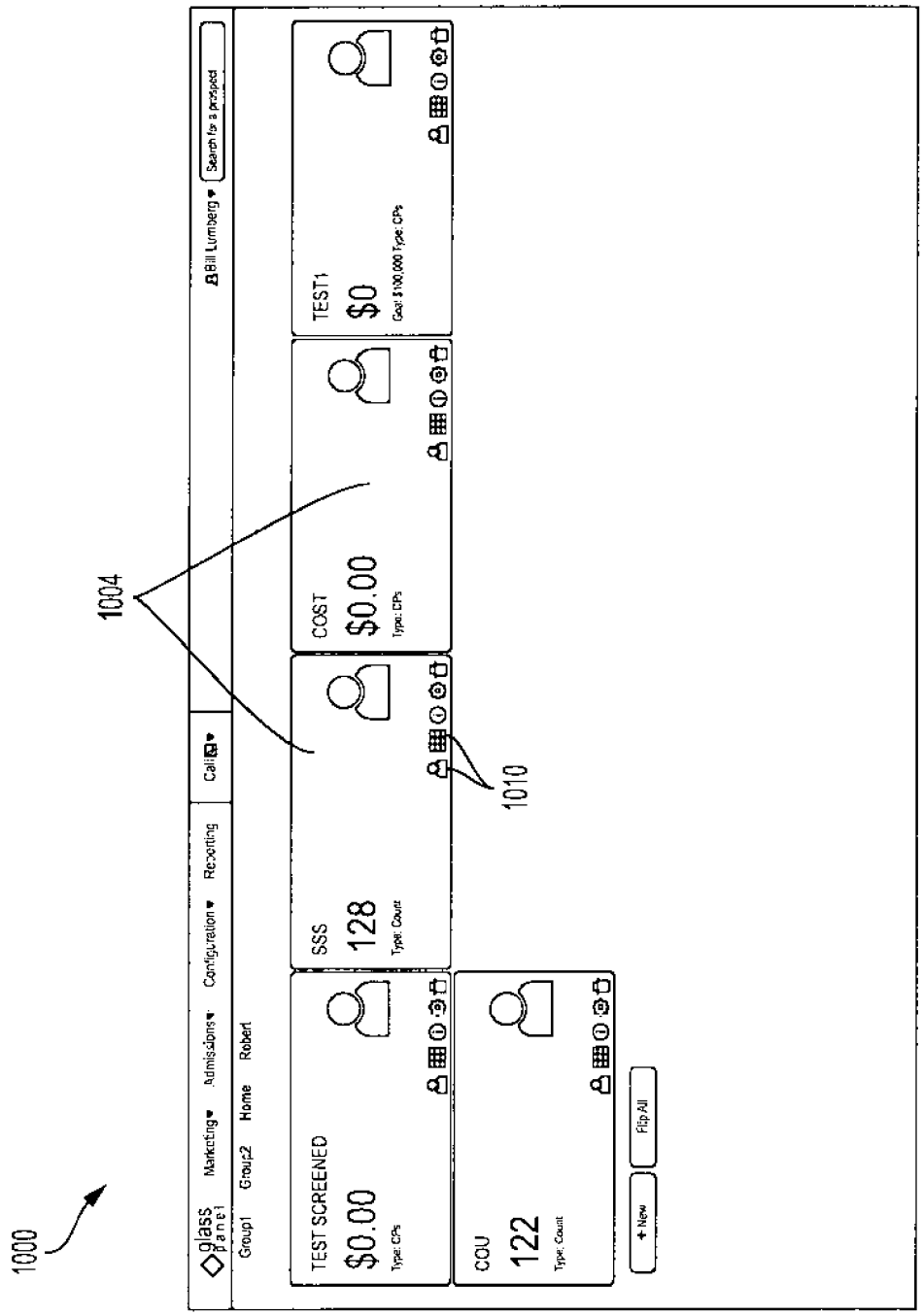
Figure 12B:
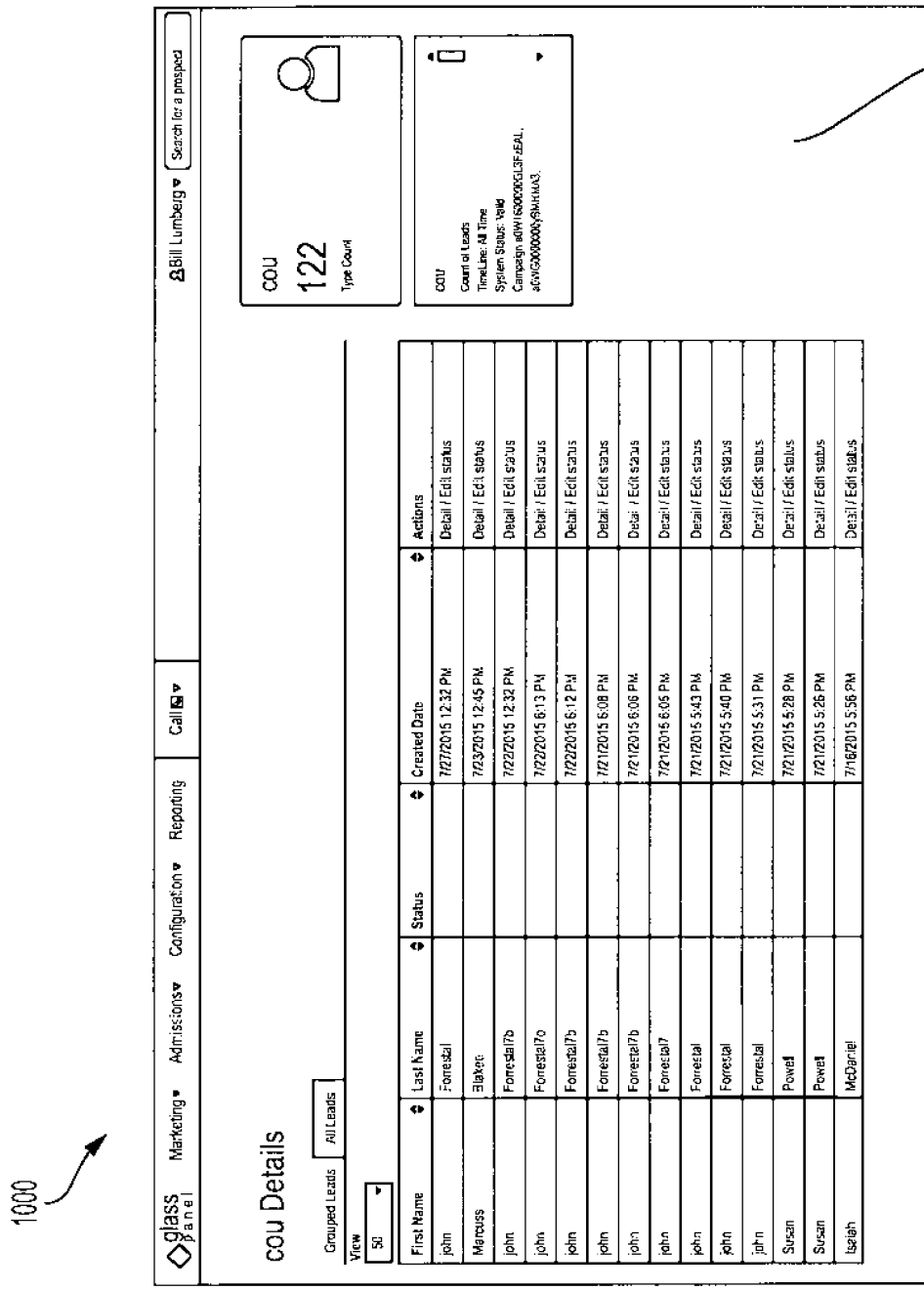
Figure 12C:
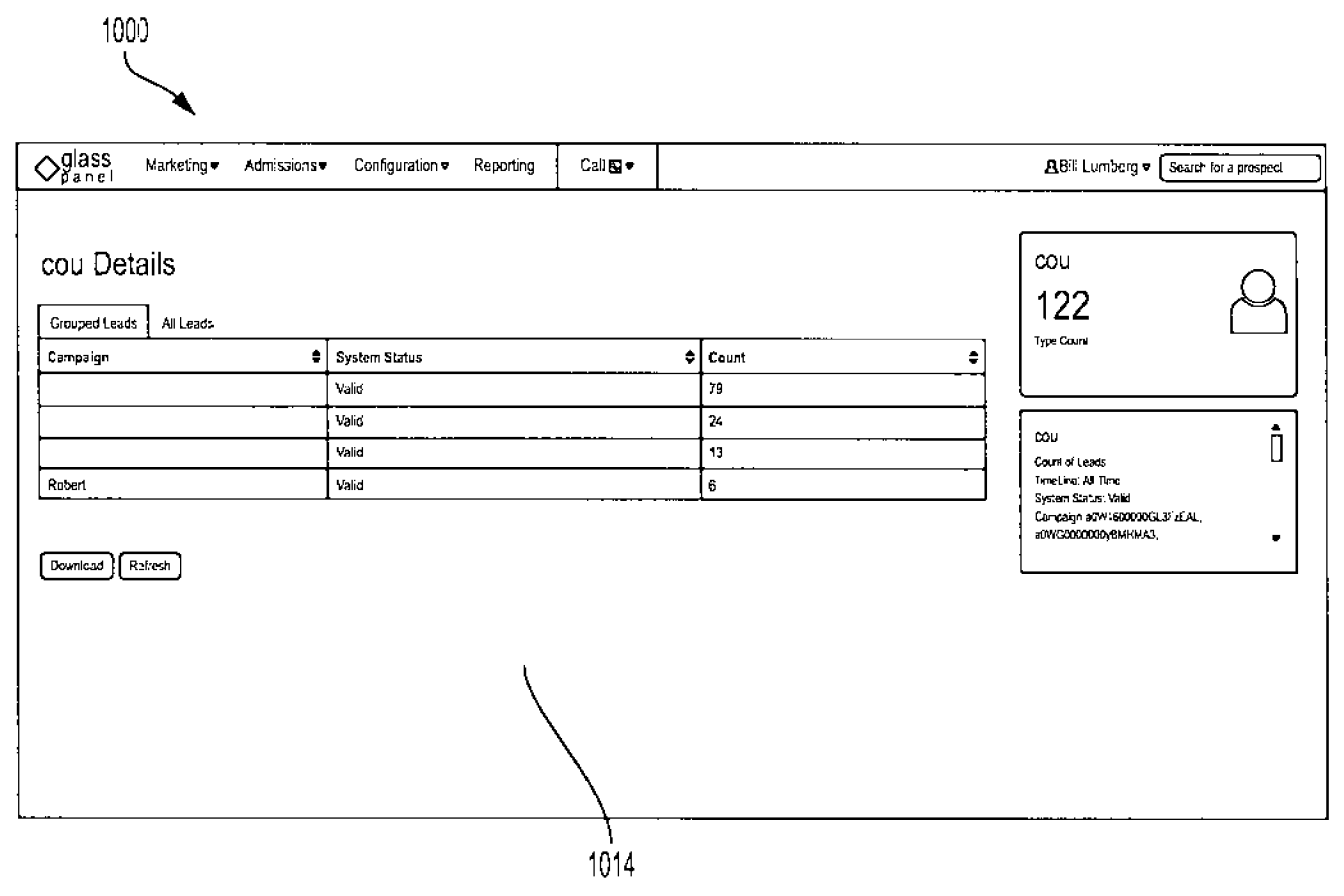

FIGS. 12A-12C are screenshots showing a further aspect of the graphical user interface 1000 according to an exemplary embodiment of the present invention. In this embodiment, the electronic cards 1004 may each include icons 1010 (for example, an icon in the shape of a person or a data table) the selection of which result in the display of one or more screens that show data pertaining to the data displayed on the electronic card. Such data may be, for example, a lower hierarchy set of data as compared to the data displayed on the electronic card 1004 so that, in essence, the user can drill down into the data by simply selecting the appropriate icon 1010. For example, as shown in FIG. 12B, selection of one icon may result in a screen 1012 that displays data related to individual leads and, as shown in FIG. 12C, selection of another icon or selection of a tab in the screen 1012 may result in a screen 1014 that displays data related to grouped leads (for example, leads grouped according to campaigns). The screens 1012, 1014 as well as other drill down data screens may also display the electronic card 1004 of interest, with data displayed in the card as well as the data in the drill down screens being updated in a persistent and dynamic manner.

Figure 13:
FIG. 13 shows an exemplary screenshot of a graphical user interface according to an exemplary embodiment of the present invention.

The graphical user interface 1000 may provide a plurality of related data sets each at a different hierarchy. As a further example, as shown in FIG. 13, selection of a particular data value from screen 1012 may result in screen 1016, which displays further data pertaining to that data value. In the case of lead data, the data value displayed in screen 1012 may be a lead name, the selection of which may result in further data pertaining to that particular lead name being displayed in screen 1016. For example, screen 1016 may display the owner (i.e., manager) of the lead, lead status, lead profile information (e.g., contact information and other lead information) and an activity timeline (e.g., meetings and phone calls related to the lead). Again, the information displayed in screen 1016 is updated in a persistent and dynamic manner.

In exemplary embodiments, each of the screens of the graphical user interface 1000 may provide a search query tool (e.g., a search query input box) so that a user may search through the database of the lead management system 5 for particular leads and/or other specific information.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

The invention claimed is:

1. A computer-implemented method to generate a graphical user interface for a lead management system, comprising:
    (a) providing a graphical user interface viewer application to one or more users for installation and use on remote mobile user electronic devices;
    (b) receiving, by a lead management computer system comprising one or more computers and non-transitory computer-readable memory operatively connected to the one or more computers, from a mobile user electronic device, a request to access lead management data defined by:
        (i) first data related to type of lead management information to be accessed; and
        (ii) second data related to format of the lead management information to be accessed;
    (c) calculating, by the lead management computer system, the lead management data by:
        (i) determining, by the lead management system, the type of lead management data to be calculated based on the first data;
        (ii) determining, by the lead management system, the format of the lead management data to be calculated based on the second data;
        (iii) accessing, by the lead management system, one or more databases to obtain raw lead management data; and
        (iv) calculating, by the lead management system, the lead management data based on the determined type and format and the accessed raw lead management data;
    (d) generating, by the lead management computer system, first machine-readable instructions to render a graphical user interface including a first lead management data graphical representation, the first lead management data graphical representation comprising one or more graphical representations of electronic cards each configurable between:
        (i) a first orientation in which a first side of the electronic card displays a portion of the calculated lead management data; and
        (ii) a second orientation in which a second side different from the first side of the electronic card displays the first and second data corresponding to the type and format of the portion of the calculated lead management data;
    (e) transmitting, by the lead management data computer system to the mobile user electronic device, the first machine-readable instructions so as to cause the mobile user electronic device to render the graphical user interface on a display associated with the mobile user electronic device,
        wherein the transmission of the first machine-readable instructions allows the one or more users to reconfigure the electronic cards between the first and second orientations by using the graphical user interface viewer application,
        wherein the graphical user interface further allows the one or more users to enter one or more parameters using the graphical user interface viewer application,
        wherein the graphical user interface further allows the one or more users to select one or more icons within each electronic card to access a second lead management data graphical representation comprising one or more graphical elements configured for input of the first and second data,
        wherein the second lead management data graphical representation allows the one or more users to modify one or more visual indicators within the electronic cards to indicate a condition of the portion of the calculated lead management data by using the graphical user interface viewer application,
        wherein the second lead management data graphical representation allows the one or more users to specify a color value and threshold value of the portion of the calculated lead management data such that a corresponding electronic card changes to the specified color to indicate that the threshold value has been passed, and
        wherein the second lead management data graphical representation allows the one or more users to define, for each electronic card, one or more groups, including a first group, from a plurality of groups to which the electronic card belongs;
    (f) receiving, by the lead management computer system from the mobile user electronic device, a selection of the first group in the plurality of groups;

(g) generating, by the lead management computer system, second machine-readable instructions to render the graphical user interface with only electronic cards that are in the first group;

(h) transmitting, by the lead management computer system to the mobile user electronic device, the second machine-readable instructions so as to cause the mobile user electronic device to display, in the graphical user interface, only electronic cards that are in the first group;

(i) receiving, by the lead management computer system from the mobile user electronic device, a selection of a first graphical user interface element rendered on the graphical user interface, wherein, before the selection of the first graphical user interface element, each of the representations of the electronic cards is displayed on the graphical user interface rendered in the first orientation;

(j) in response to receiving the selection of the first graphical user interface element, generating, by the lead management computer system, third machine-readable instructions to render the graphical user interface such that each of the representations of electronic cards is rendered in the second orientation; and (k) transmitting, by the lead management computer system to the mobile user electronic device, the third machine-readable instructions so as to cause the mobile user electronic device to display, in the graphical user interface, each of the representations of electronic cards rendered in the second orientation, wherein the graphical user interface displays the one or more visual indicators in association with the portion of the calculated lead management data in at least one of the first orientation on the first side of the electronic card and the second orientation on the second side of the electronic card based at least in part on the one or more parameters.

2. The computer-implemented method of claim 1, further comprising the step of determining, by the lead management computer system, whether to authorize access to the lead management data.

3. The computer-implemented method of claim 2, wherein the step of determining whether to authorize access comprises:
receiving, by the lead management computer system, from the user electronic device, user identification data; and
determining, by the lead management computer system, whether the user identification is valid.

4. The computer-implemented method of claim 1, further comprising:
generating, by the lead management system, fourth machine-readable instructions to render the graphical user interface with the second lead management data graphical representation; and
transmitting, by the lead management data computer system to the user electronic device, the fourth machine-readable instructions so as to cause the user electronic device to render the graphical user interface with the second lead management data graphical representation on the display associated with the user electronic device,
wherein the transmission of the fourth machine-readable instructions allows the one or more users to input the first and second data to the one or more graphical elements by using the graphical user interface viewer application.

5. The computer-implemented method of claim 4, wherein the type of lead management information comprises one or more types selected from the group consisting of:
count, total cost, rate, cost per lead attribute, cost per lead and average time.

6. The computer-implemented method of claim 4, wherein the format of lead management information comprises one or more formats selected from the group consisting of:
number, percentage and dollar amount.

7. The computer-implemented method of claim 4, further comprising the steps of:
receiving, by the lead management computer system, from the user electronic device, updated first and second data; and
calculating, by the lead management computer system, updated lead management data by:
(i) determining, by the lead management system, the type of lead management data to be calculated based on the updated first data;
(ii) determining, by the lead management system, the format of the lead management data to be calculated based on the updated second data;
(ii) accessing, by the lead management system, one or more databases to obtain raw lead management data; and
(iii) calculating, by the lead management system, updated lead management data based on the determined type and format and the accessed raw lead management data;
wherein the first lead management data graphical representation comprises one or more graphical representations of electronic cards that display the updated lead management data.

8. The computer-implemented method of claim 1, further comprising the steps of:
receiving, by the lead management computer system, from the user electronic device, a request to access lead management data at a lower hierarchy than the calculated lead management data;
generating, by the lead management computer system, fourth machine-readable instructions to render a graphical user interface including the second lead management data graphical representation, the second lead management data graphical representation comprising one or more graphical elements configured for display of the lead management data at the lower hierarchy than the calculated lead management data; and
transmitting, by the lead management data computer system to the user electronic device, the fourth machine-readable instructions so as to cause the user electronic device to render the graphical user interface on a display associated with the user electronic device,
wherein the transmission of the fourth machine-readable instructions allows the one or more users to view and manipulate the lower hierarchy lead management data by using the graphical user interface viewer application.

9. The computer-implemented method of claim 8, wherein the step of receiving a request to access lower hierarchy lead management data comprises:
receiving, by the lead management computer system, from the user electronic device, a selection of the calculated lead management data as displayed in one of the one or more graphical representations of electronic cards for which the lower hierarchy lead management data is to be determined.

10. The computer-implemented method of claim 1, wherein the one or more visual indicators comprise at least one of size or brightness.

11. A mobile electronic device comprising:
an electronic display; and
a graphical user interface viewer application that allows for reconfiguration of a first lead management data graphical representation as displayed in a graphical user interface on the electronic display, the first lead management data graphical representation comprising one or more graphical representations of electronic cards each configurable between:
  (i) a first orientation in which a first side of the electronic card displays a portion of lead management data as calculated by a remote lead management system; and
  (ii) a second orientation in which a second side different from the first side of the electronic card displays first data related to type of lead management information to be accessed and second data corresponding to format of the lead management information to be accessed, the first and second data having been used by the remote lead management system to calculate the portion of the lead management data,
wherein the mobile electronic device is configured to:
  (a) receive input from one or more users to reconfigure the electronic cards between the first and second orientations;
  (b) receive one or more parameters entered by the one or more users using the graphical user interface viewer application;
  (c) receive a selection of one or more icons within each electronic card to access a second lead management data graphical representation as displayed in the graphical user interface on the electronic display;
  (d) receive input from the one or more users to modify one or more visual indicators within the electronic cards to indicate a condition of the portion of the calculated lead management data by using the graphical user interface viewer application;
  (e) receive input from the one or more users to specify a color value and threshold value of the calculated lead management data such that a corresponding electronic card changes to the specified color to indicate that the threshold value has been passed;
  (f) receive, from the one or more users via the second lead management data graphical representation, input to assign a first group from a plurality of groups to one or more electronic cards;
  (g) receive, from the one or more users, a selection of a first graphical element corresponding to the first group;
  (h) in response to the selection of the first graphical element corresponding to the first group, display, via the graphical user interface, only the one or more electronic cards assigned to the first group;
  (i) display, via the graphical user interface, the one or more visual indicators in association with the portion of the calculated lead management data in at least one of the first orientation on the first side of the electronic card and the second orientation on the second side of the electronic card based at least in part on the one or more parameters;
  (j) receive, via the graphical user interface, a selection of a second graphical element, wherein, before the selection of the second graphical element, each of the representations of the electronic cards is rendered on the graphical user interface in the first orientation; and
  (k) in response to the selection of the second graphical element, display, via the graphical user interface, each of the representations of electronic cards rendered in the second orientation.

12. The mobile electronic device of claim 11, wherein the mobile electronic device is further configured to:
receive, via the graphical user interface viewer application, the first and second data, wherein the first and second data is input by the one or more users to one or more graphical elements of the second lead management data graphical representation as displayed in the graphical user interface on the electronic display.

13. The mobile electronic device of claim 11, wherein the one or more visual indicators comprise at least one of size or brightness.

14. A computer-implemented method to generate a graphical user interface for a lead management system, comprising:
  (a) providing a graphical user interface viewer application to one or more users for installation and use on remote mobile user electronic devices;
  (b) receiving, by a lead management computer system comprising one or more computers and non-transitory computer-readable memory operatively connected to the one or more computers, from a mobile user electronic device, a request to access lead management data defined by:
    (i) first data related to type of lead management information to be accessed; and
    (ii) second data related to format of the lead management information to be accessed;
  (c) calculating, by the lead management computer system, the lead management data by:
    (i) determining, by the lead management system, the type of lead management data to be calculated based on the first data;
    (ii) determining, by the lead management system, the format of the lead management data to be calculated based on the second data;
    (iii) accessing, by the lead management system, one or more databases to obtain raw lead management data; and
    (iv) calculating, by the lead management system, the lead management data based on the determined type and format and the accessed raw lead management data;
  (d) generating, by the lead management computer system, first machine-readable instructions to render a graphical user interface including a first lead management data graphical representation, the first lead management data graphical representation comprising one or more graphical representations of electronic cards each configurable between:
    (i) a first orientation in which a first side of the electronic card displays a portion of the calculated lead management data; and
    (ii) a second orientation in which a second side different from the first side of the electronic card displays the first and second data corresponding to the type and format of the portion of the calculated lead management data;
  (e) transmitting, by the lead management data computer system to the mobile user electronic device, the first machine-readable instructions so as to cause the mobile user electronic device to render the graphical user interface on a display associated with the mobile user electronic device, wherein the transmission of the first machine-readable instructions allows the one or more users to reconfigure the electronic cards between the first and second orientations by using the graphical user interface viewer application, wherein the graphical user interface further allows the one or more users to enter one or more parameters using the graphical user interface viewer application, wherein the graphical user interface further allows the one or more users to select one or more icons within each electronic card to access a second lead management data graphical representation comprising one or more graphical elements configured for input of the first and second data, wherein the second lead management data graphical representation allows the one or more users to modify one or more visual indicators within the electronic cards to indicate a condition of the portion of the calculated lead management data by using the graphical user interface viewer application, wherein the second lead management data graphical representation allows the one or more users to specify a color value and threshold value of the portion of the calculated lead management data such that a corresponding electronic card changes to the specified color to indicate that the threshold value has been passed, and wherein the second lead management data graphical representation allows the one or more users to define, for each electronic card, one or more groups, including a first group, from a plurality of groups to which the electronic card belongs;

(f) receiving, by the lead management computer system from the mobile user electronic device, a selection of a first graphical user interface element rendered on the graphical user interface, wherein, before the selection of the first graphical user interface element, each of the representations of the electronic cards is displayed on the graphical user interface rendered in the first orientation;

(g) in response to receiving the selection of the first graphical user interface element, generating, by the lead management computer system, second machine-readable instructions to render the graphical user interface such that each of the representations of electronic cards is rendered in the second orientation; and (h) transmitting, by the lead management computer system to the mobile user electronic device, the second machine-readable instructions so as to cause the mobile user electronic device to display, in the graphical user interface, each of the representations of electronic cards rendered in the second orientation, wherein the graphical user interface displays the one or more visual indicators in association with the portion of the calculated lead management data in at least one of the first orientation on the first side of the electronic card and the second orientation on the second side of the electronic card based at least in part on the one or more parameters.

* * * * *